(12) United States Patent
Asako

(10) Patent No.: US 7,069,467 B2
(45) Date of Patent: Jun. 27, 2006

(54) SYSTEM AND METHOD FOR DATA MULTIPLEXING

(75) Inventor: Takashi Asako, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 183 days.

(21) Appl. No.: 10/785,974

(22) Filed: Feb. 26, 2004

(65) Prior Publication Data
US 2005/0147132 A1 Jul. 7, 2005

(30) Foreign Application Priority Data
Jan. 7, 2004 (JP) .............................. 2004-002314

(51) Int. Cl.
G06F 11/00 (2006.01)

(52) U.S. Cl. .......................... 714/6; 711/161; 711/162; 370/429; 370/216

(58) Field of Classification Search ........ 370/363–371; 711/162–165, 156, 118, 144; 714/4–7, 38
See application file for complete search history.

(56) References Cited

U.S. PATENT DOCUMENTS

| 5,388,254 A | 2/1995 | Betz et al. |
| 5,530,872 A | 6/1996 | Smeltzer et al. |
| 5,758,057 A | 5/1998 | Baba et al. |
| 5,917,723 A * | 6/1999 | Binford ..................... 700/2 |
| 6,321,345 B1 | 11/2001 | Mann et al. |
| 6,442,711 B1 * | 8/2002 | Sasamoto et al. ............. 714/38 |
| 6,493,772 B1 | 12/2002 | Hughes |
| 6,643,734 B1 | 11/2003 | Mabuchi et al. |
| 6,735,672 B1 | 5/2004 | Nishikawa et al. |
| 6,789,165 B1 | 9/2004 | Apperley et al. |
| 6,799,283 B1 | 9/2004 | Tamai et al. |
| 2002/0038436 A1 * | 3/2002 | Suzuki ..................... 714/6 |
| 2004/0034750 A1 * | 2/2004 | Horn ..................... 711/156 |
| 2005/0138315 A1 * | 6/2005 | Eguchi et al. ............. 711/165 |

FOREIGN PATENT DOCUMENTS

JP 8-263221 10/1996

\* cited by examiner

Primary Examiner—Hassan Kizou
Assistant Examiner—Salman Ahmed
(74) Attorney, Agent, or Firm—Mattingly, Stanger, Malur & Brundidge, P.C.

(57) ABSTRACT

To reduce the load on a host for controlling a data doubling. Between a host and two disk subsystems, there is connected a data doubling device. This data doubling device behaves as if it were a unit disk subsystem for the host. The data doubling device doubles a data I/O instruction from the host and issues the doubled data I/O instruction to two disk subsystems. In case either of the disk subsystems becomes faulty, the data doubling device sends the data I/O instruction from the host only to the normal disk subsystem. After the fault recovery, the data doubling device performs a data copy between the disk subsystems.

16 Claims, 26 Drawing Sheets

SYSTEM AND METHOD FOR DATA MULTIPLEXING

CROSS-REFERENCE TO RELATED APPLICATIONS

This application relates to and claims priority from Japanese Patent Application No. 2004-002314, filed on Jan. 7, 2004, the entire disclosure of which is incorporated herein by reference.

BACKGROUND OF THE INVENTION

1. Field of the Invention

The present invention relates to a technique for multiplexing and storing data in a storage system such as a RAID system.

2. Description of the Related Art

In order to improve the reliability of data storage, the data are stored in a storage system by multiplexing or typically doubling the data. In Patent Document 1, for example, there is disclosed a doubling magnetic disk device, which is connected to a host device and provided with two magnetic disk devices. This doubling magnetic disk device has a copy function and a double-line write function for doubling and storing the data in the two magnetic disk devices. According to this copy function, in response to a copy instruction from a host device, the doubling magnetic disk device reads data stored in one magnetic disk device and writes the data in the other magnetic disk device. According to this double-line write function, the doubling magnetic disk device accepts a double-line write instruction from the host device, and writes the data accepted from the host device, in parallel in both two magnetic disk devices.

[Patent Document 1] JP-A-8-263221

In order that the data may be doubled by using the aforementioned doubling magnetic disk device, the host device has to be provided with a function to issue the copy instruction or the double-line write instruction, that is, the function to control the data doubling. Naturally, resources such as the CPU or the main memory of the host device are used to control the doubling of the data or the restoration of the doubled data after a fault occurred. Since the resources of the host device are used at the data restoration after the fault, the host device may be unable to start its business quickly.

SUMMARY OF THE INVENTION

Therefore, an object of the invention is to reduce the functions, resources or processing loads, which are required for a host device to control the data doubling in a storage system.

Another object of the invention is to enable the storage system to perform the data doubling even if the host device does not have the function to control the data doubling.

Still another object of the invention is to reduce the functions, resources or processing loads, which are required for the host device to control the restoration of the doubling data after the storage system was faulty.

A further object of the invention is to enable the storage system to perform the data doubling and the restoration of the doubled data in the storage system without using the resources such as a CPU and a main memory of the host device to the utmost.

Other objects of the invention will become apparent from the following description of embodiments.

According to the invention, a data multiplexing device is interposed between a host device and a plurality of storage systems. The data multiplexing device behaves as if it were a unit storage system for the host device. The data multiplexing device multiplexes an original data write/read instruction issued from the host device thereby to create a plurality of data write/read instructions, and issues those data write/read instructions individually to a plurality of storage systems. The data multiplexing device accepts responses from the storage systems to the data write/read instructions, creates a response to the host device in response to those responses, and returns the response to the host device. Moreover, the data multiplexing device can be provided with a function to perform a data recovery processing of the storage system autonomously after a fault recovery, in case the fault occurs in any of the storage systems.

A data multiplexing system according to one specific mode of the invention comprises: a host device having a processor for running an application program and an operating system, to issue an original data write/read instruction; a data multiplexing device connected to the host device; and first and second storage systems individually connected to the data multiplexing device for storing data for the host device.

The data multiplexing device includes: a host interface controller for making the communication connection to the host device; first and second slave interface units for making the communication connections to the first and second storage systems, respectively; a multiplexing controller for accepting the original data write/read instruction from the host device through the host interface controller and for creating first and second data write/read instructions by multiplexing the original data write/read instruction; a monitor memory; and a monitor for storing the monitor memory with the time information and the data I/O address on the first and second data write/read instructions, for issuing the first and second data write/read instructions, respectively, to the first and second storage systems through the slave interface controller, for accepting responses individually from the first and second storage systems to the first and second data write/read instructions, for creating responses to the original data write/read instruction on the basis of the responses from the first and second storage systems, and for returning the created responses to the host device.

The monitor decides it on the basis of the time information stored in the monitor memory whether or not the responses from the first and second storage systems have arrived within a predetermined permissible time, and creates a response to the original data write/read instruction in accordance with the result of the decision.

According to one embodiment, the multiplexing controller creates first and second data write instructions, in case the original data write/read instruction is a data write instruction, by multiplexing the original data write instruction. Moreover, the monitor issues the first and second data write instructions, respectively, to the first and second storage systems, creates data write/read completion notifications as the response to the original data write instruction after a response indicating the write completion notification arrived from the first and second storage systems within the permissible time, and returns the data write/read completion notifications to the host device.

According to one embodiment, the data multiplexing device further comprises a data recovery controller for instructing the data multiplexing device to execute a data recovery processing. The monitor creates a data write/read completion notification as the response to the original data write instruction, in case the response indicating the write completion notification has arrived from the first storage system within the permissible time but the response indicating the write completion notification has not arrived from the second storage system within the permissible time, returns the data write/read completion notification to the host device, decides that the data write processing has abnormally ended in the second storage system, and sends an abnormal end notification on the second storage system to the data recovery controller.

According to one embodiment, the monitor sends a first data write instruction based on a new original data write instruction, to the first storage system but not a second data write instruction based on the new original data write instruction, to the second storage system, each time the new original data write instruction is issued from the host device after it decided that the data write processing in the second storage system abnormally ended. Moreover, the monitor stores the monitor memory with the time information and the data write address of a first data write instruction according to the new original data write instruction. After this, the monitor extracts the unmultiplexed data, which are stored in the first storage system but not in the second storage system, in case it is instructed to execute the data recovery processing from the data recovery controller after it decided that the data write processing in the second storage system was abnormally ended, on the basis of the time information and the data write address of the first data write instruction, which have been issued and are stored in the monitor memory, and copies the extracted unmultiplexed data from the first storage system to the second storage system.

According to one embodiment, the data recovery controller instructs the data multiplexing device not only the execution the data recovery processing but also the ratio of the data recovery processing to the processing of the original data write/read instruction issued from the host device. The monitor controls the distribution of the loads in the data multiplexing device between the processing of the original data write/read instruction and the processing to copy the unmultiplexed data from the first storage system to the second storage system, in accordance with the ratio instructed by the data recovery controller.

According to one embodiment, the multiplexing controller creates first and second data read instructions, in case the original data write/read instruction is a data read instruction, by multiplexing the original data read instruction. The monitor issues the first and second data read instructions, respectively, to the first and second storage systems, and returns, after the response having the read data arrived from either of the first and second storage systems within the permissible time, the read data as the response to the original data read instruction, to the host device.

According to one embodiment, the data multiplexing device further includes first and second data cache memories assigned to the first and second storage systems, respectively.

The multiplexing controller creates first and second data write instructions, in case the original data write/read instruction is a data write instruction, by multiplexing the original data write instruction. The monitor accepts the first and second data write instructions from the multiplexing controller, and issues the first and second data write instructions instantly to the first and second storage systems instantly without accessing to the first and second data cache memories.

On the other hand, the multiplexing controller creates first and second data read instructions, in case the original data write/read instructions are a data read instruction, by multiplexing the original data read instruction. The monitor accepts the first and second data read instructions from the multiplexing controller, searches the object data of the first and second read instructions, respectively, from the first and second data cache memories, and issues the first and second data read instructions, respectively, to the first and second storage systems in case the object data are not individually found from the first and second data cache memories.

According to one embodiment, the data multiplexing system further comprises a host computer having the host device. And, the data multiplexing device exists outside of the host computer and is connected to the host computer.

According to one embodiment, the data multiplexing system further comprises a host computer having the host device. And, the data multiplexing device is assembled inside of the host computer.

According to one embodiment, the data multiplexing device is assembled inside of the storage system.

According to another but specific mode of the invention, a data multiplexing system comprises: a host device, a data multiplexing device connected to the host device, and first and second storage systems connected to the data multiplexing device. The host device includes: a memory for storing an application program and an operating system; and a processor for running the application program and the operating system.

The data multiplexing device includes: a first interface controller connected to the host device for accepting a data write instruction from the host device; a multiplexing controller for creating a copy of the data write instruction accepted by the first interface controller; a monitor for managing the time information and attribute information from the multiplexing controller individually on the data write instruction and the copy of the data write instruction; a monitor memory for storing the time information and attribute information to be managed by the monitor; a second interface controller for transferring the data write instruction in accordance with the control by the monitor; and a third interface controller for transferring the copy of the data write instruction in accordance with the control by the monitor.

The first storage system includes: a fourth interface controller connected to the second interface controller of the data multiplexing device for accepting the data write instruction from the second interface controller; a first storage controller connected to the four interface controller for accepting the data write instruction and controlling the write processing of write data; and a first storage drive device for storing the write data in accordance with the control by the first storage controller. The second storage system includes: a fifth interface controller connected to the third interface controller of the data multiplexing device for accepting the copy of the data write instruction from the third interface controller; a second storage controller connected to the fifth interface controller for accepting the copy of the data write instruction and controlling the write processing of the same data as the write data; and a second storage drive device for storing the same data as the write data in accordance with the control by the second storage controller.

The monitor of the data multiplexing device monitors the data writ completion notification to the data write instruction returned from the first storage system, on the basis of the time information and the attribute information stored in the monitor memory, and the data write completion notification to the copy of the data write instruction returned from the second storage system, and issues the data write completion notification to the data write instruction, to the host device after it accepted both the data write completion notification from the first storage system and the data write completion notification from the second storage system.

The invention also provides the aforementioned data doubling device.

The invention further provides a data doubling method to be performed by the aforementioned data doubling device.

According to the invention, it is possible to reduce the functions, resources or processing loads, which are required for the host device to control the data doubling in the storage system.

DESCRIPTION OF THE PREFERRED EMBODIMENTS

Figure 1:
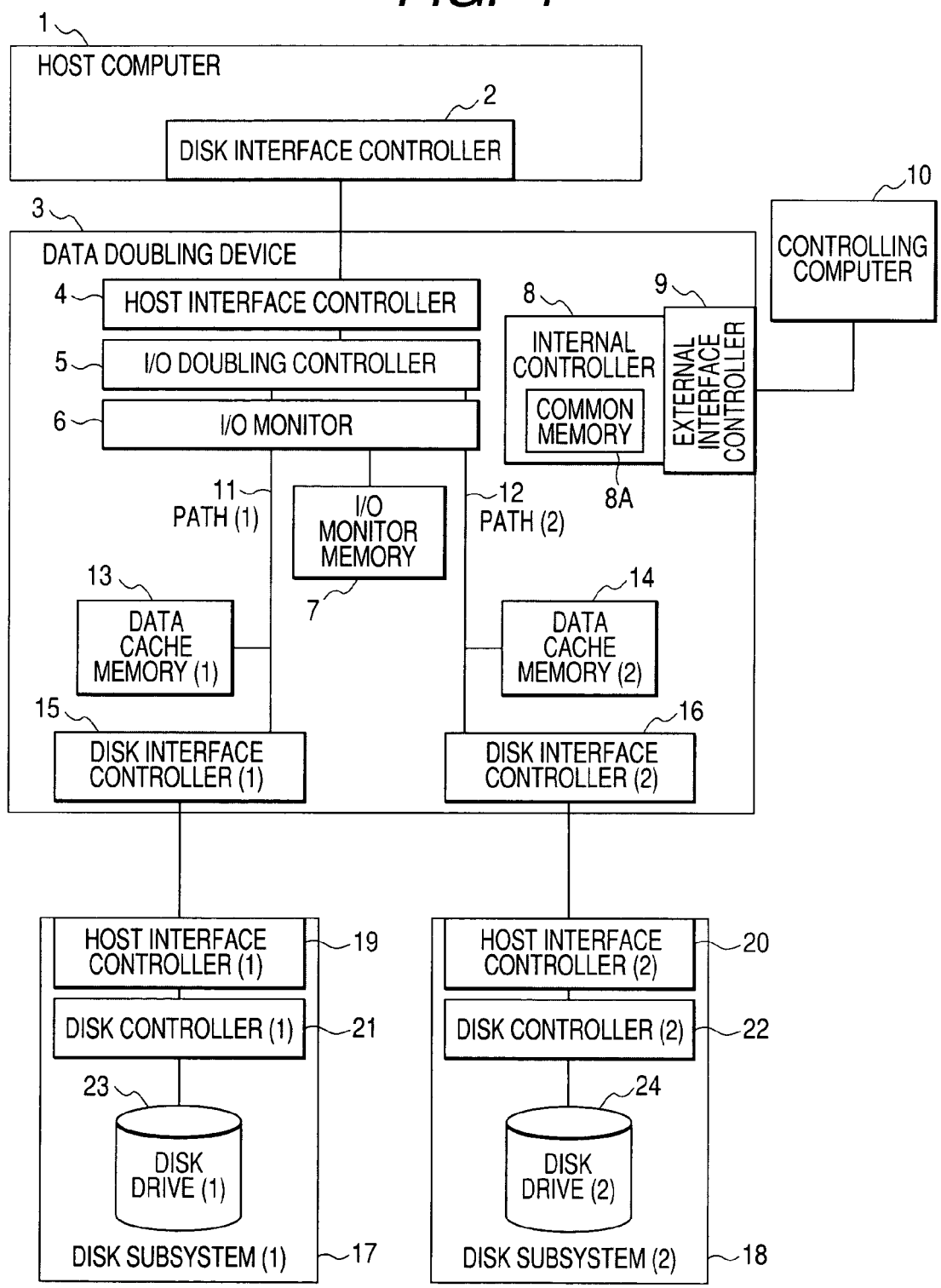
FIG. 1 is a block diagram showing the entire construction of a data multiplexing system according to one embodiment of the invention.

FIG. 1 is a block diagram showing the entire construction of a data multiplexing system according to one embodiment of the invention.

As shown in FIG. 1, there is a host computer 1 for running a business processing. This host computer 1 is provided with a CPU and a main memory, although not shown, and is installed with application programs and an operating system (OS) for the business processing. The CPU runs the programs by loading them into the main memory. For this host computer 1, on the other hand, there are at least two storage systems for storing data to be used in the business processing, such as disk subsystems 17 and 18 according to the principle of the RAID. Moreover, at least one data doubling device 3 according to the principle of the invention is interposed between the host computer 1 and the disk subsystems 17 and 18. The host computer 1 outputs a data write instruction or a data read instruction (which will be generally called the "data I/O (input/output) instruction") of the data to be used in the business processing, to the data doubling device 3. The data doubling device 3 controls the disk subsystems 17 and 18 thereby to process the data I/O instruction from the host computer 1 and to return a response to the data I/O instruction, to the host computer 1.

The host computer 1 is provided with at least one disk interface controller 2, which is communicatively connected to the disk subsystem to control the data communication therewith. To this disk interface controller 2, there is connected the data doubling device 3 via a communication line or a communication network in place of the disk subsystems 17 and 18. This data doubling device 3 is provided with at least two disk interface controllers 15 and 16, which are communicatively connected to the disk subsystems for the data communications therewith. To these disk interface controllers 15 and 16, respectively, there are connected the disk subsystems 17 and 18 via communication lines or a communication network.

The data doubling device 3 is provided with at least one host interface controller 4, which is communicatively connected to the host computer for controlling the communications therewith. This host interface controller 4 is connected to the disk interface controller 2 of the host computer 1. The disk subsystems 17 and 18 are also respectively provided with host interface controllers 19 and 20, which are connected to the disk interface controllers 15 and 16, respectively, of the data doubling device 3. The disk subsystems 17 and 18 are respectively provided with disk drives 23 and 24 for storing the data, and disk controllers 21 and 22 for controlling the data transfers between the host interface controllers 19 and 20 and the disk drives 23 and 24. Each of the disk drives 23 and 24 may be a unit recording disk drive (e.g., a hard disk drive). Usually, however, the disk drive 23 or 24 is usually constructed of an array of a multiplicity of recording disk drives (e.g., hard disk drives) and is controlled, for example, according to the principle of the RAID by the disk controller 21 or 22.

As understood from the construction thus far described, the host computer 1 communicates directly not with the disk subsystems 17 and 18 but the data doubling device 3. The host interface controller 4 owned by the data doubling device is similar to the host interface controller 19 or 20 owned by one disk subsystem 17 or 18. Therefore, the disk interface controller 2 of the host computer 1 performs a communication control similar to that of the case, in which it communicates with one disk subsystem, for the communication with the data doubling device. In short, the data doubling device 3 makes the two disk subsystems 17 and 18 behave as if they were one disk subsystem for the host computer 1. On the other hand, the data doubling device 3 has a data doubling control function to double the data to be used by the host computer 1 thereby to share and store the doubled data in the two disk subsystems 17 and 18. This data doubling control operation can be completely performed in the data doubling device 3 and does not need any special instruction or control therefor from the host computer 1. Therefore, the host computer 1 does not need have the data doubling control function. The host computer 1 may behave as if it were one disk subsystem for the data doubling device 3.

The internal construction of the data doubling device 3 having that function will be described in the following.

As shown in FIG. 1, the data doubling device is provided with: an I/O doubling controller 5; an I/O monitor 6; an I/O monitor memory 7; two data communication paths 11 and 12 connected to the two disk interface controllers 15 and 16, respectively; and two data cache memories 13 individually connected to those two data communication paths 11 and 12.

The I/O doubling controller 5 is connected to the host interface controller 4 and the I/O monitor 6 and further to the two communication paths 11 and 12. The I/O doubling controller 5 has a double write control function to accept a data write instruction from the host computer 1 through the host interface controller 4, to double the data write instruction, to transfer the doubled data write instruction to the I/O monitor 6, and to return a data write completion notification or an abnormal end notification as a response to the data write instruction from the host computer 1, to the host computer 1 through the host interface controller 4. On the other hand, the I/O doubling controller 5 has a double read control function to accept a data read instruction from the host computer 1 through the host interface controller 4, to double the data read instruction, to transfer the doubled data read instruction to the I/O monitor 6, and to return a data read completion notification (read data) (in the following, the data write completion notification and the data read completion notification will be generally called as the "I/O completion notification") or an abnormal end notification as a response to the data read instruction from the host computer 1, to the host computer 1 through the host interface controller 4. The I/O doubling controller 5 further has a path-through mode control function to stop the data doubling processing, in case a fault occurs in either of the two disk subsystems 17 and 18, and to control the write and read of the data (in the following, this control state will be called the "pass-through mode") only for the other normal disk subsystem 18 (or 17).

The I/O monitor 6 is connected to the I/O doubling controller 5 and the I/O monitor memory 7 and further to the two communication paths 11 and 12. The I/O monitor 6 has an I/O instruction relay function to accept the doubled I/O instructions (i.e., the data write instruction or the data read instruction) from the I/O doubling controller 5, to send those doubled I/O instructions individually through the disk interface controllers 15 and 16 to the two disk subsystems 17 and 18, to accept the I/O completion notification (i.e., the write completion notification or the read completion notification (or the read data)) as the responses to those I/O instructions individually through the disk interface controllers 15 and 16 from the two disk subsystems 17 and 18, and to transfer the I/O completion notifications to the I/O doubling controller 5. On the other hand, the I/O monitor 6 has a doubling I/O monitor function to decide it by monitoring the I/O completion notifications from the disk subsystems 17 and 18 whether or not the doubled I/O instructions have been normally processed at the disk subsystems 17 and 18 (that is, whether or not the disk subsystems 17 and 18 are faulty), and to notify the I/O doubling controller 5 of the decision result. For this doubling I/O monitor function, the I/O monitor 6 records the I/O management information for managing the processing state of the doubled I/O instruction, in the I/O monitor memory 7, and refers to the I/O management information. The I/O management information contains the accepting time (or the issuing time) and the I/O attributes (e.g., the identification of the host computer 1, the discrimination of write or read, the read address or the write address) of the doubled I/O instruction, the presence or absence and the accepting time of the I/O completion notification corresponding to each I/O instruction, and so on. The doubling I/O management information recorded in the I/O monitor memory 7 is also used for restoring, after one of the disk subsystems 17 and 18 was faulty, the data in the faulty disk subsystem 17 (or 18) on the basis of the data in the normal disk subsystem 18 (or 17), thereby to make the data doubling complete. The I/O monitor 6 further has a function to close, in case the fault of one of the disk subsystem 17 (or 18) is detected by the aforementioned doubling I/O monitor function, the path 11 (or 12) for the communication with the disk subsystem 17 (or 18) till the disk subsystem 17 (or 18) recovers from the fault, and to instruct the I/O doubling controller 5 to act in the aforementioned pass-through mode.

The data cache memories 13 and 14 are used for temporarily holding the data read from the disk subsystems 17 and 18, respectively, in response to the data read instructions. Specifically, the data read from the disk subsystems 17 and 18 are written in the data cache memories 13 and 14, respectively, by the disk interface controllers 15 and 16 and are then read from the data cache memories 13 and 14 by the I/O monitor 6 and sent to the host computer 1. However, the data cache memories 13 and 14 are not used for holding the data to be written in the disk subsystems 17 and 18 in response to the data write instructions. Specifically, the write data from the host computer 1 are directly transferred, simultaneously as received by the data doubling device 3, to the disk interface controllers 15 and 16 not through the data cache memories 13 and 14 and are sent to the disk subsystems 17 and 18. Thus in the data write case, the write data from the host computer 1 are instantly transferred to the disk subsystems 17 and 18 by the data doubling device 3 not by using the data cache memories 13 and 14, thereby to reduce the danger of the data loss, as might otherwise be caused by the fault of the data doubling device 3.

The data doubling device 3 is further provided with an internal controller 8 for performing basic controls on the actions and functions thereof. The internal controller 8 is connected (although the connection lines are omitted from FIG. 1) to the aforementioned several units in the doubling device 3 (e.g., the host interface controller 4, the I/O doubling controller 5, the I/O monitor 6, the I/O monitor memory 7, and the disk interface controllers 15 and 16). The internal controller 8 is provided with a common memory 8A, which can be accessed to from the aforementioned several units in the doubling device 3. The internal controller 8 is further connected through an external interface controller 9 to a controlling computer 10 arranged outside of the data doubling device 3. The internal controller 8 accepts the initialization information, which is composed of a plurality of predetermined items necessary for the basic controls of the actions and functions of the data doubling device 3 from the controlling computer 10, and stores the information in the common memory 8A. On the basis of the initialization information stored in the common memory 8A, moreover, there are controlled the basic actions and functions of the aforementioned several units in the doubling device 3, such as the host interface controller 4, the I/O doubling controller 5, the I/O monitor 6, the I/O monitor memory 7 and the disk interface controllers 15 and 16.

The more specific functions and actions of the aforementioned data doubling device 3 will become apparent from the following description.

In the following, the actions of the data multiplexing system shown in FIG. 1 will be described with reference to the flow charts of FIG. 2 to FIG. 9.

Figure 2:
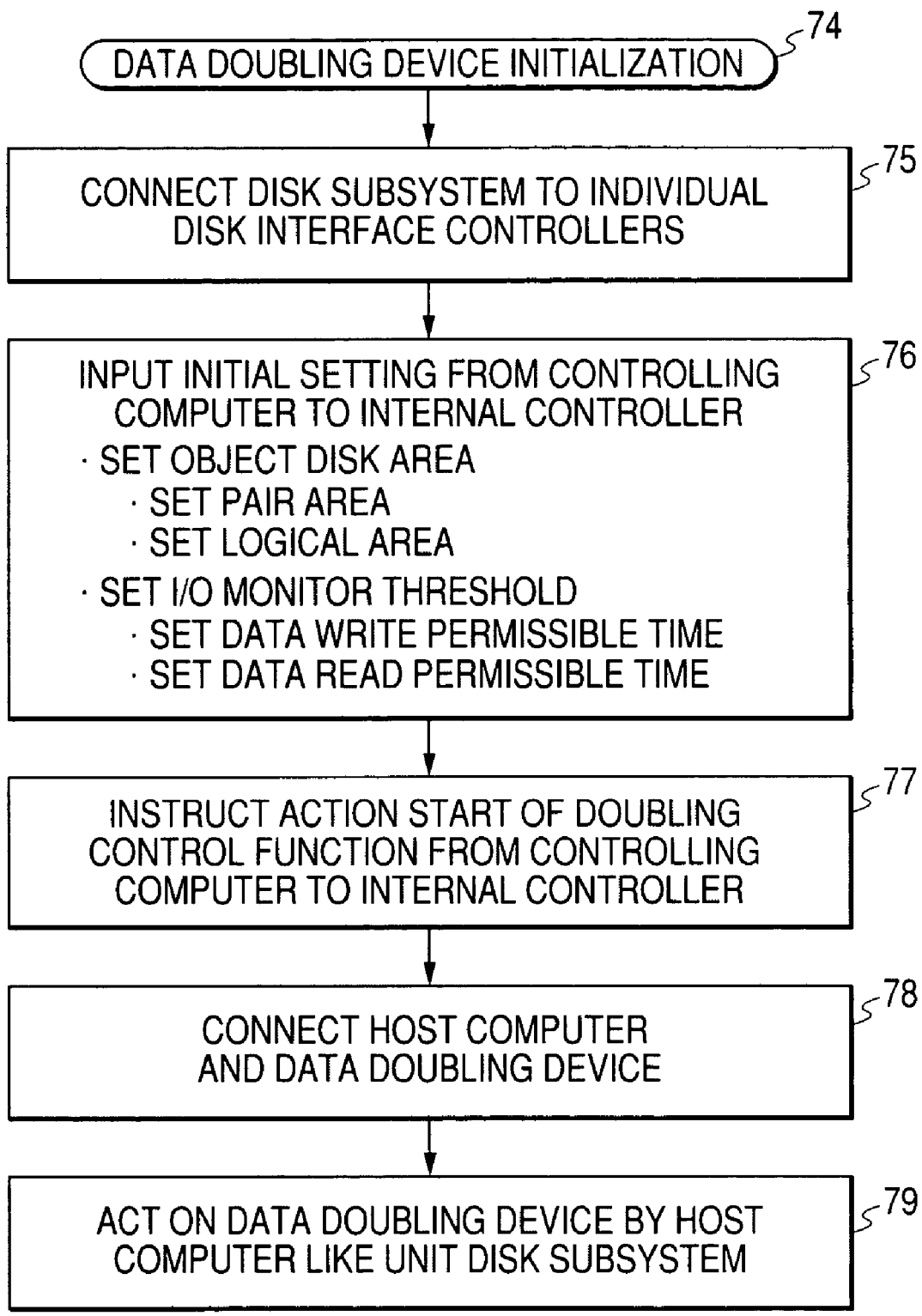
FIG. 2 is a flow chart of an initialization of a data doubling device 3.

FIG. 2 shows a flow of the initialization of the data doubling device.

At an initialization 74 of the data doubling device, as shown in FIG. 2, at Step 75, the disk subsystems 17 and 18 are communicatively connected to the disk interface controllers 15 and 16, respectively, of the data doubling device 3. At Step 76, the initialization information is inputted from the controlling computer 10 to the internal controller 8 of the data doubling device 3.

The initialization information contains the settings of an object disk area and an I/O monitor threshold. The object disk area setting contains a pair area setting and a logical area setting. The pair area setting defines what disk area in one disk subsystem 17 and what disk area in the other disk subsystem 18 are paired so that the common doubled data are stored in the paired disk areas. The logical area setting defines the logical address of the disk area in the two disk subsystems 17 and 18. This logical address is composed of a logical volume number and a logical block number so that the I/O address (i.e., the write address and the read address) contained in the I/O instruction from the host computer 1 is expressed in the logical address. To the paired disk areas in the two disk subsystems 17 and 18 defined by the pair area setting, there is assigned the common logical address, by which the two disk subsystems 17 and 18 appear in the host computer 1 as if they were a unit disk subsystem.

The aforementioned I/O monitor threshold setting contains the settings of a data write permissible time and a data read permissible time, which are used by the I/O monitor 6 to decide whether or not the I/O instruction has been normally processed by each of the disk subsystems 17 and 18 (that is, whether or not each of the disk subsystems 17 and 18 is faulty). Specifically, the data write permissible time is the permissible time for the I/O monitor 6 to decide that the data write instruction has been normally processed, after the data write instruction was sent to each disk subsystem 17 or 18 and before the I/O completion notification is returned from each disk subsystem 17 or 18. In case the I/O completion notification is not returned from the disk subsystem 17 or 18 even after that time elapsed, it is decided by the I/O monitor 6 that the data write instruction has not been normally processed by the disk subsystem 17 or 18 (i.e., that the disk subsystem 17 or 18 is faulty). The data read permissible time is the permissible time for the I/O monitor 6 to decide that the data read instruction has been normally processed, after the data read instruction was sent to each disk subsystem 17 or 18 and before the I/O completion notification is returned from each disk subsystem 17 or 18. In case the read data (or the I/O completion notification) is not returned from the disk subsystem 17 or 18 even after that time elapsed, it is decided by the I/O monitor 6 that the data read instruction has not been normally processed by the disk subsystem 17 or 18 (i.e., that the disk subsystem 17 or 18 is faulty).

When the foregoing initialization is ended, the action start of the data doubling control function is instructed at Step 77 from the controlling computer 10 to the internal controller 8. In response to this instruction, the data doubling control function can be activated on the basis of the initialization information, whereby the data doubling device 3 controls the two disk subsystems 17 and 18 to behave as if they were a unit disk subsystem, as seen from the host computer 1.

After this, at Step 78, the host computer 1 is communicatively connected to the data doubling device 3. At Step 79, the data doubling device 3 starts to act as if it were a unit disk subsystem for the host computer 1, thereby to perform the data write processing, the data read processing or the fault recovery processing, as will be described in the following.

Figure 3:
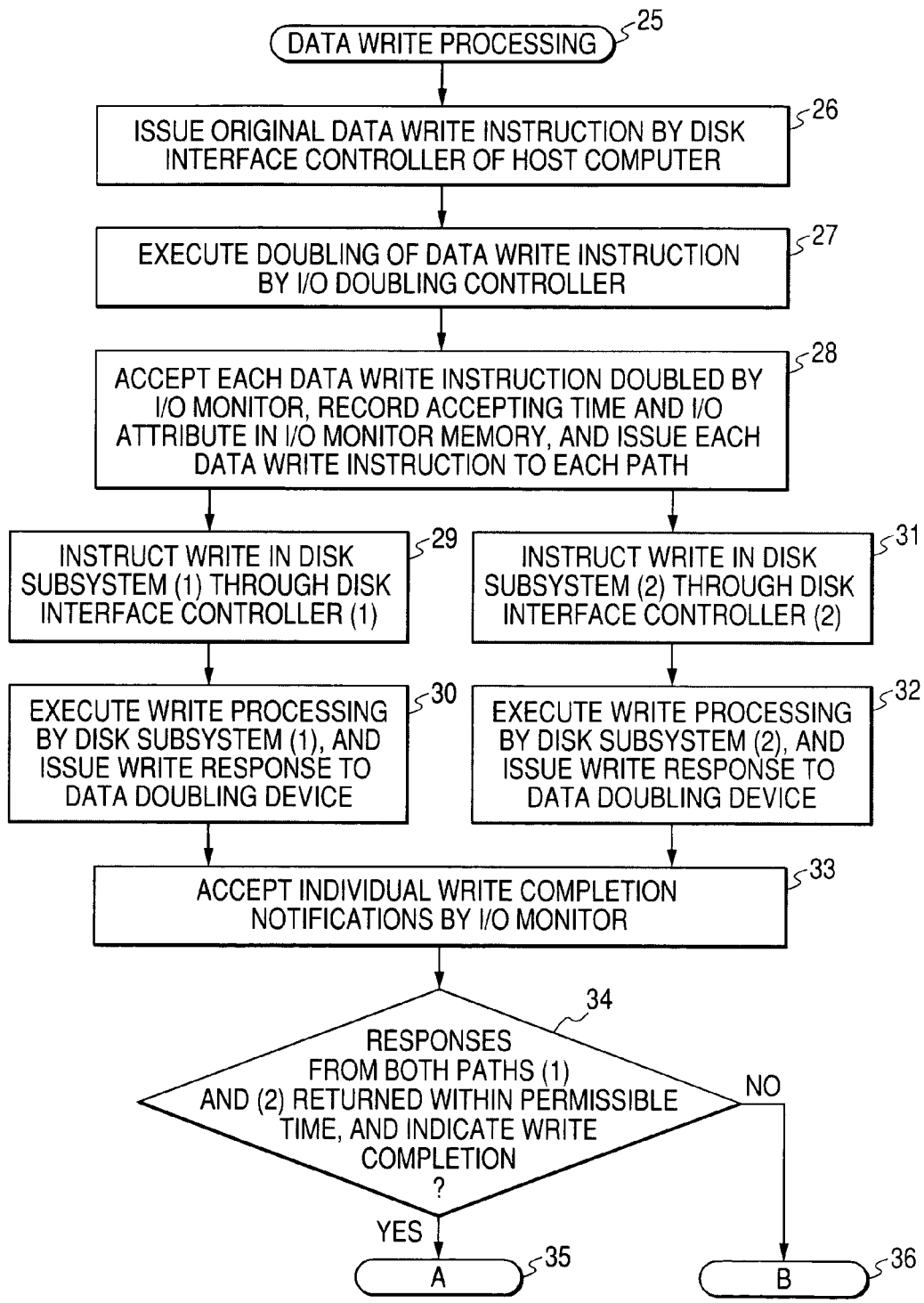
FIG. 3 is a flow chart of a data write processing in the system of FIG. 1.
Figure 4:
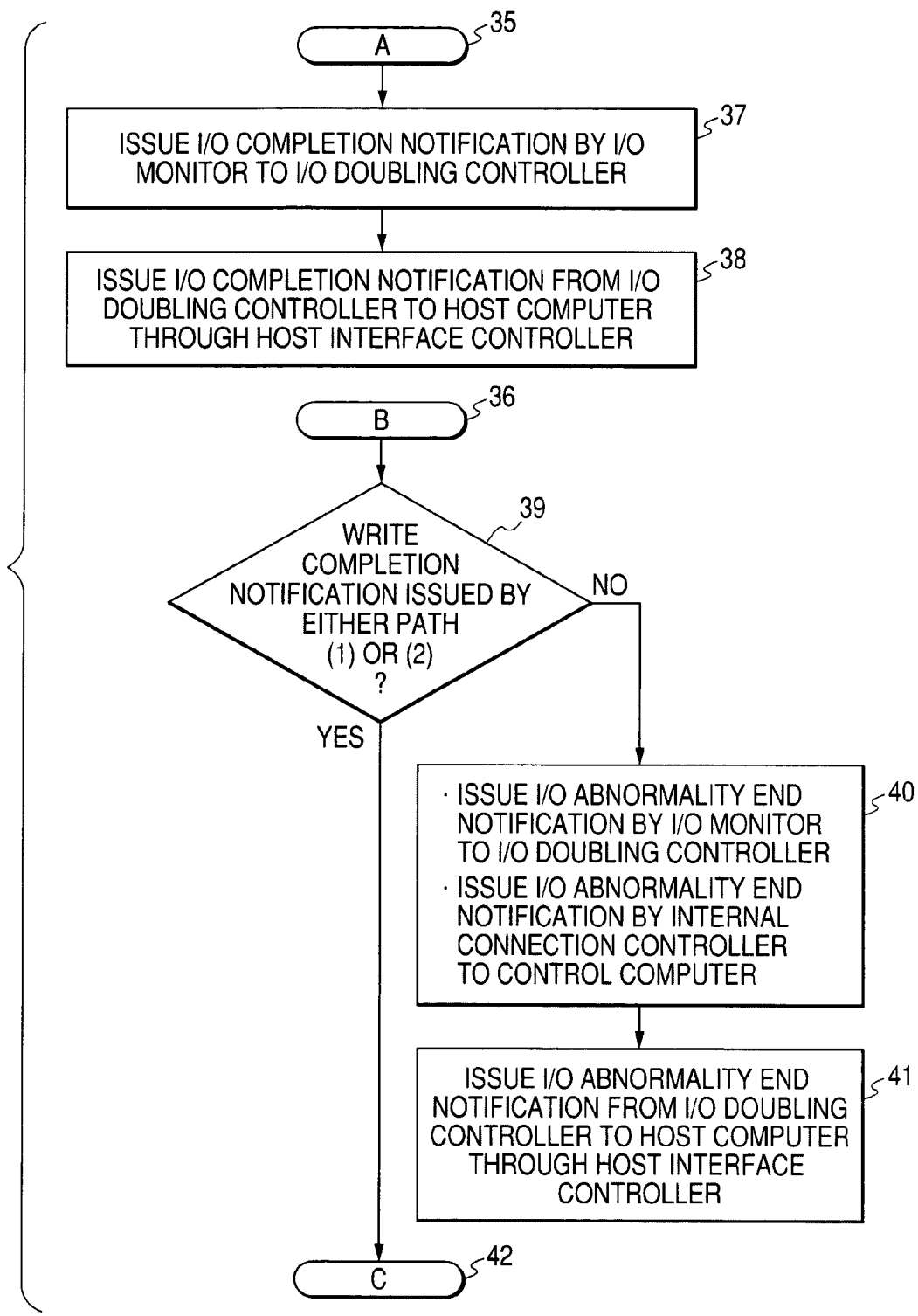
FIG. 4 is a flow chart of the data write processing in the system of FIG. 1.
Figure 5:
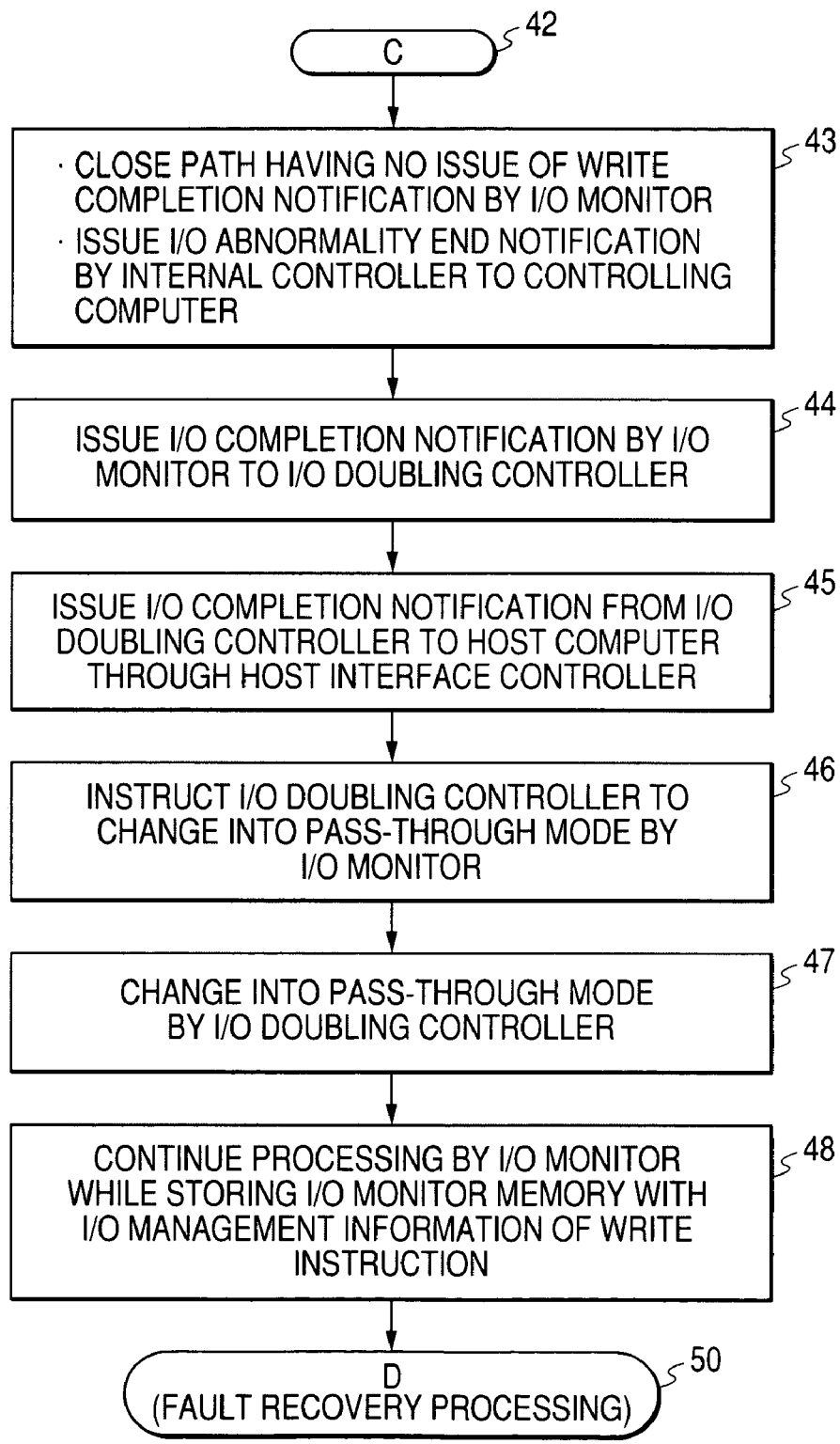
FIG. 5 is a flow chart of the data write processing in the system of FIG. 1.

FIG. 3 to FIG. 5 show the flow of the data write processing.

In the data write processing 25, as shown in FIG. 3, at Step 26, an original data write instruction is issued to the data doubling device 3 by the disk interface controller 2 of the host computer 1. This original data write instruction is inputted to the I/O doubling controller 5 through the host interface controller 4 of the data doubling device 3. At Step 27, the I/O doubling controller 5 doubles the data write instruction by creating a copy of the original data write instruction. At Step 28, the I/O monitor 6 accepts the doubled data write instruction and stores the I/O monitor memory 7 with the individual pieces of I/O management information of the doubled data write instruction, namely, the accepting time (or the issuing time) and the I/O attributes (e.g., the identification of the host computer 1, the discrimination of write or read, and the write address) of each write instruction. Then, the I/O monitor 6 outputs the doubled data write instruction to the respective communication paths 11 and 12 of the two disk subsystems 17 and 18.

At Steps 29 and 31, the two disk interface controllers 15 and 16 send the doubled data write instruction to the two disk subsystems 17 and 18, respectively. In the data write processing, the data cache memories 13 and 14 in the data doubling device 3 are not used for the data write processing, as has been described hereinbefore. Therefore, the data write instruction to the disk subsystems 17 and 18 is sent in synchronism with (i.e., instantly) the acceptance of the data write instruction from the host computer 1. At Steps 30 and 32, the two disk subsystems 17 and 18 execute the data write processing on the disk drives 23 and 24, respectively, in accordance with the data write instruction. Then, the two disk subsystems 17 and 18 return the write responses indicating the results of their individual data write processings to the data doubling device 3.

At Step 33, the I/O monitor 6 of the data doubling device 3 accepts the write responses from the individual disk subsystems 17 and 18 through the communication paths 11 and 12, respectively. At Step 34, the I/O monitor 6 checks whether or not both the responses from the two communication paths 11 and 12 have arrived within the aforementioned write permissible time from the accepting time of the write instruction and indicate the write completion (i.e., that the data write processing has been normally executed). The control advances to a routine A shown in FIG. 4, in case the result of the check of Step 34 is YES, but to a routine B shown in FIG. 4 in case the result is NO.

In the routine A, as shown in FIG. 4, at Step 37, the I/O monitor 6 issues the I/O completion notification to the I/O doubling controller 5. At Step 38, the I/O doubling controller 5 issues the I/O completion notification to the host computer 1 through the host interface controller 4.

In the routine B, as shown in FIG. 4, at Step 39, the I/O monitor 6 checks which of the two communication paths 11 and 12 the response (or the write completion notification) indicating the write completion has arrived from. In case the result of this check is YES, the control advances to a routine C shown in FIG. 5. In case the result of this check is NO (that is, the write completion notification has not arrived from either of the two paths 11 and 12), on the contrary, at Step 40, the I/O monitor 6 issues the I/O abnormal end notification to the I/O doubling controller 5. Moreover, the internal controller 8 issues the I/O abnormal end notification to the controlling computer 10. At Step 41, the I/O doubling controller 5 issues the I/o abnormal end notification to the host computer 1 through the host interface controller 4.

In case the write completion notification arrives from only one of the two communication paths 11 and 12, as described above, the control advances to the routine C shown in FIG. 5. In the routine C, at Step 43, the I/O monitor 6 closes the communication path 11 (or 12) having no arrival of the write completion notification. Moreover, the internal controller 8 issues the I/O abnormal end notification to the controlling computer 10. At Step 44, the I/O monitor 6 issues the I/O completion notification to the I/O doubling controller 5. At Step 45, the I/O doubling controller 5 issues the I/O completion notification to the host computer 1 through the host interface controller 4. At Step 46, the I/O monitor 6 instructs the I/O doubling controller 5 to change its action motor from the doubling processing mode into the pass-through mode. In response to this instruction, at Step 47, the I/O doubling controller 5changes the action mode into the pass-through mode, whereby not the data doubling processing but the I/O processing of the data is performed by using only the normal communication path 12 (or 11). After this and till the pass-through mode ends, at Step 48, the I/O monitor 6 continues the aforementioned data write processing while recording the monitor memory 7 with the I/O management information of the data write instruction, to which the data doubling processing has not been applied. As a result, the monitor memory 7 is stored with the I/O management information of the data write instruction, to which the data doubling processing has not been applied. After this, there is performed the fault recovery processing, as indicated by a routine D and will be described hereinafter. Here, the I/O management information of the data write instruction, to which the data doubling processing stored in the monitor memory 7 in the pass-through mode has not been applied, is utilized in the fault recovery processing indicated by the routine D.

Figure 6:
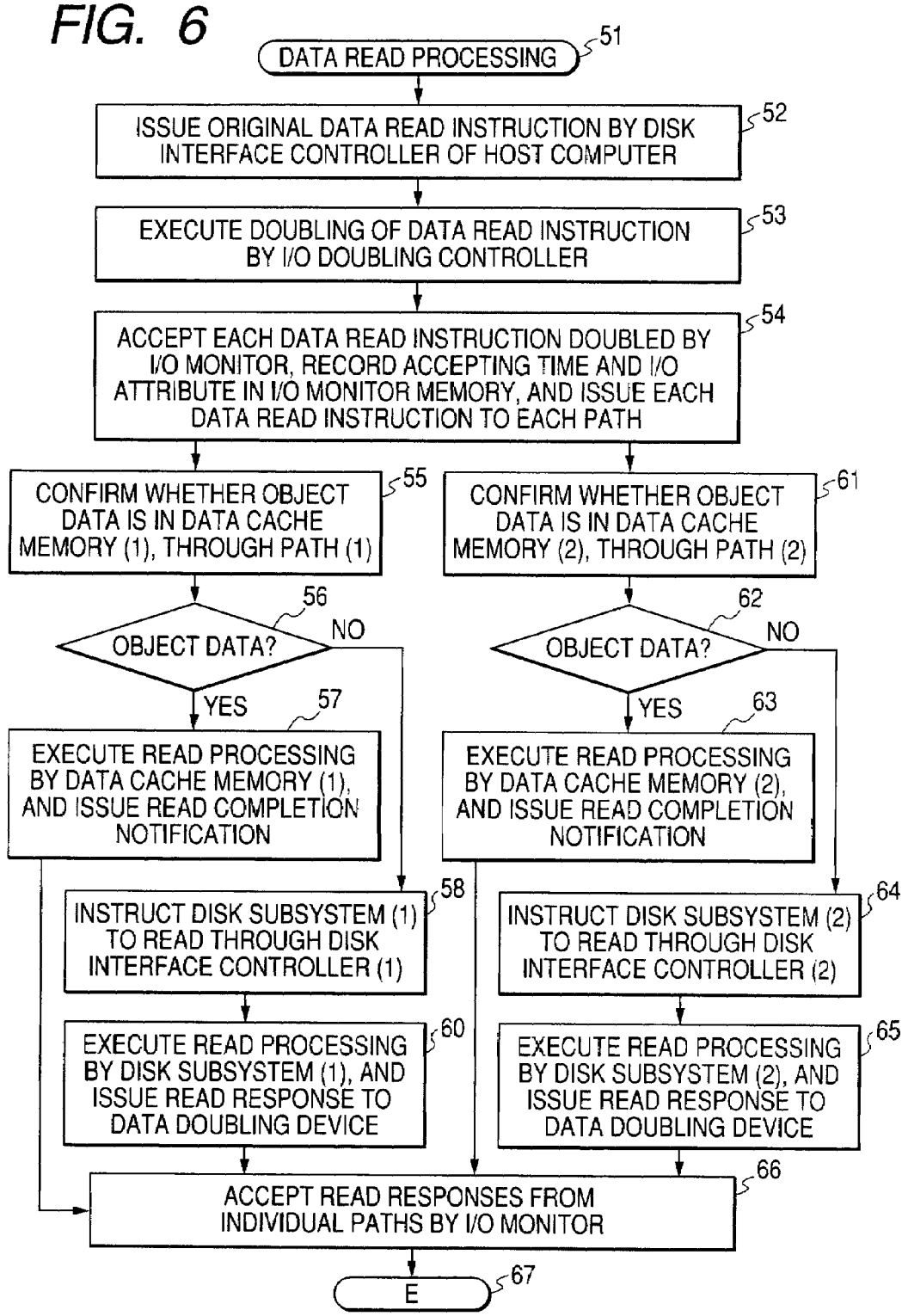
FIG. 6 is a flow chart of a data read processing in the system of FIG. 1.
Figure 7:
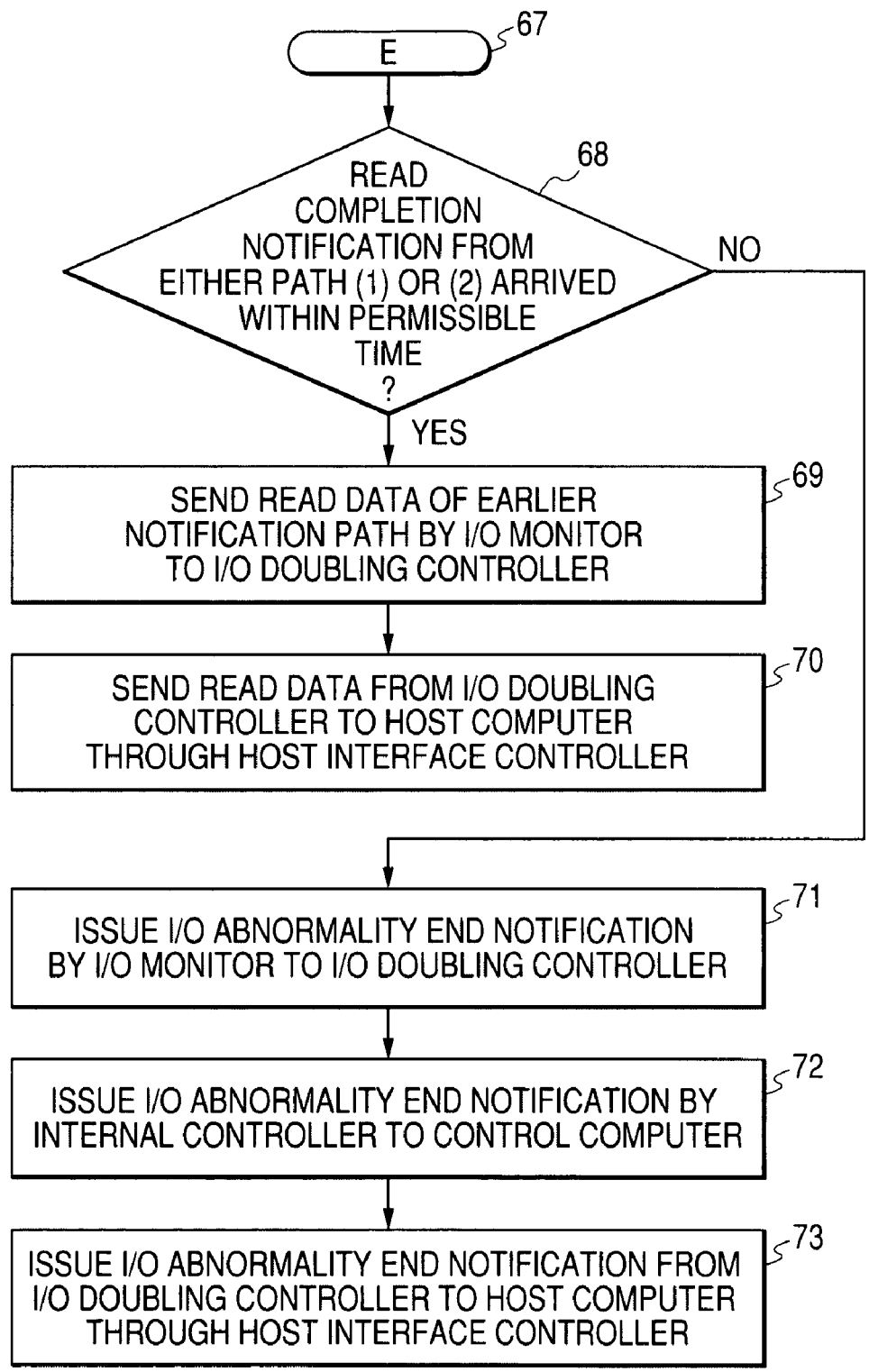
FIG. 7 is a flow chart of the data read processing in the system of FIG. 1.

FIG. 6 and FIG. 7 show the flow of the data read processing.

In the data read processing 51, as shown in FIG. 6, at Step 52, an original data read instruction is issued to the data doubling device 3 by the disk interface controller 2 of the host computer 1. This original data read instruction is inputted to the I/O doubling controller 5 through the host interface controller 4 of the data doubling device 3. At Step 53, the I/O doubling controller 5 doubles the data read instruction by creating a copy of the original data read instruction. At Step 54, the I/O monitor 6 accepts the doubled data read instruction and stores the I/O monitor memory 7 with the individual pieces of I/O management information of the doubled data read instruction, namely, the accepting time (or the issuing time) and the I/O attributes (e.g., the identification of the host computer 1, the discrimination of read or read, and the read address) of each data read instruction. Then, the I/O monitor 6 outputs the doubled data read instruction to the respective communication paths 11 and 12 of the two disk subsystems 17 and 18.

At Steps 55 and 61, in response to the data read instructions on the communication paths 11 and 12, the cache memories 13 and 14 search their respective object data from the cache memories 13 and 14. If the object data are found in the cache memories 13 and 14 at Steps 56 and 62, the cache memories 13 and 14 return the responses (i.e., the read completion notifications) individually indicating the data read completions to the I/O monitor 6 at Steps 57 and 63, and the I/O monitor 6 accepts the read completion notifications at Step 66.

In case the object data are not found in the cache memories 13 and 14 at Steps 56 and 62, on the contrary, the disk interface controllers 15 and 16 transmit the data read instructions to the two disk subsystems 17 and 18, respectively, at Steps 58 and 64. At Steps 60 and 65, the two disk subsystems 17 and 18 execute the data read processing from the disk drives 23 and 24, respectively, in accordance with the data read instructions. The two disk subsystems 17 and 18 return the read responses indicating the results of their individual data read processings to the data doubling device 3.

At Step 66, the I/O monitor 6 of the data doubling device 3 accepts the read responses from the individual disk subsystems 17 and 18 through the communication paths 11 and 12, respectively. The control advances to a routine E shown in FIG. 7. In the routine E, at Step 68, the I/O monitor 6 checks whether or not the read completion notification has arrived from one of the two communication paths 11 and 12 after the accepting time of the data read instruction and by the time the read permissible time has elapsed. In case the result of this check is YES, at Step 69, the I/O monitor 6 sends the read data accepted from the communication path 11 (or 12) of the earlier read completion notification, to the I/O doubling controller 5. At Step 70, the I/O doubling controller 5 sends the read data to the host computer 1 through the host interface controller 4.

In case the result of the check of Step 68 is NO (that is, the read completion notification has not arrived from either of the two paths 11 and 12), on the contrary, at Step 71, the I/O monitor 6 issues the I/O abnormal end notification to the I/O doubling controller 5. At Step 72, moreover, the internal controller 8 issues the I/O abnormal end notification to the controlling computer 10. At Step 73, the I/O doubling controller 5 issues the I/O abnormal end notification to the host computer 1 through the host interface controller 4.

As can be understood from the aforementioned Steps 68 to 70, in the data read processing, any special action (in the data read processing, for example, the controlling computer is notified of the I/O abnormal end notification, or the pass-through mode is entered) is not performed even if the read completion notification does not come from either the disk subsystem 17 or 18. This is partly because no problem arises even if such special action is not done and partly because the data read processing can be simply performed at a high speed. For another reason, a fault, if any in either disk subsystem 17 or 18, will be detected and subjected before long to a proper treatment in the data read processing.

Figure 8:
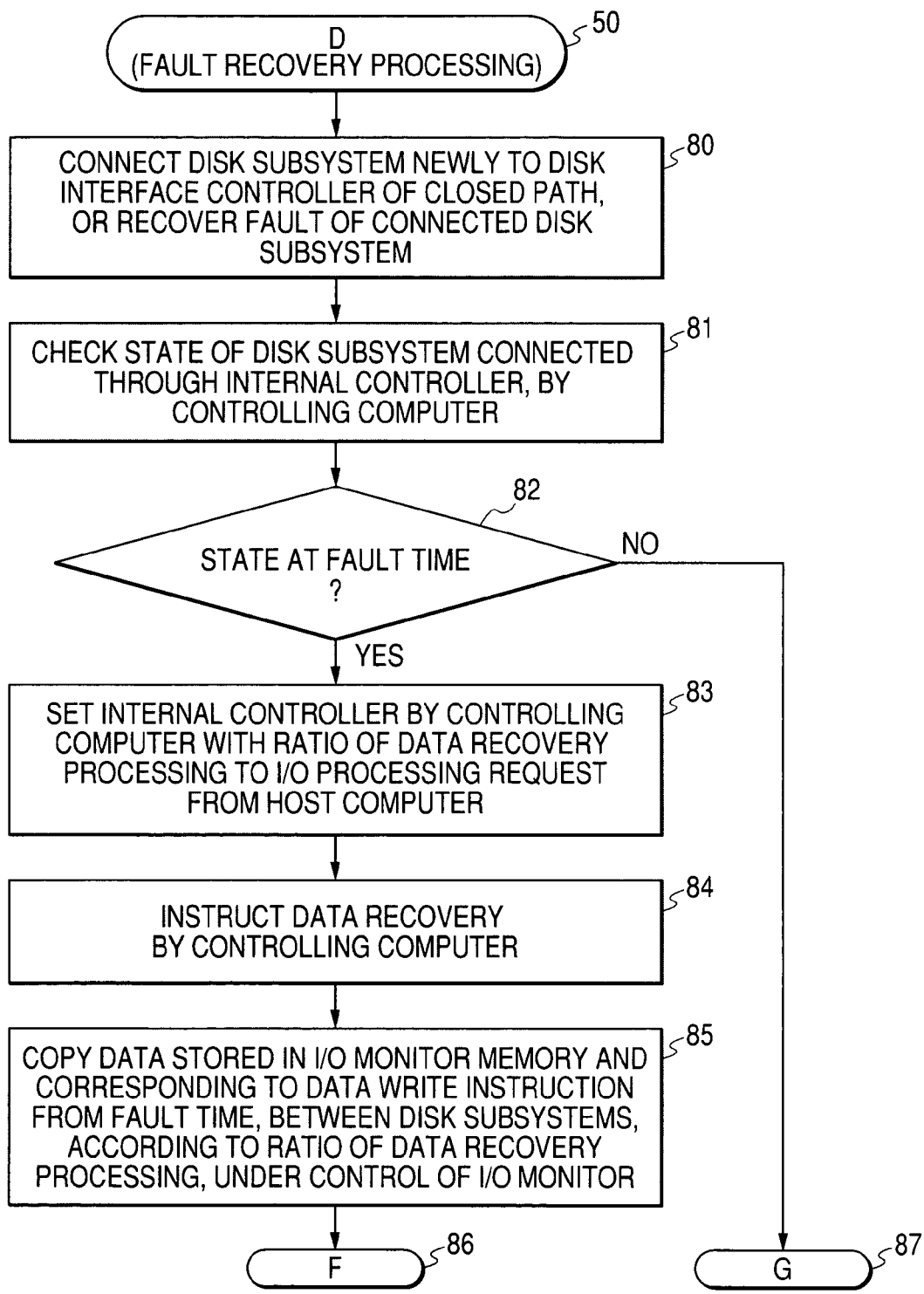
FIG. 8 is a flow chart of a fault recovery processing in the system of FIG. 1.
Figure 9:
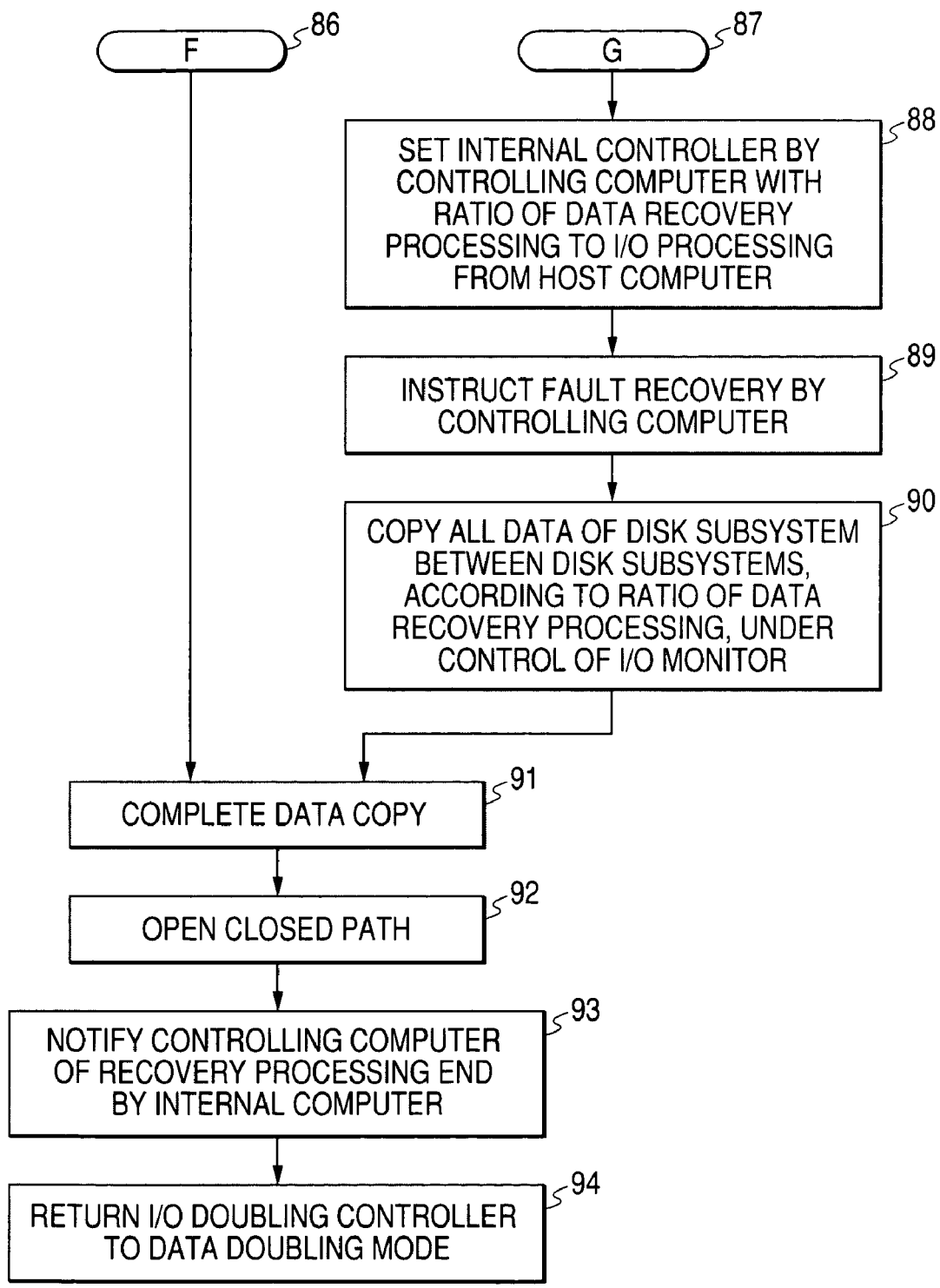
FIG. 9 is a flow chart of the fault recovery processing in the system of FIG. 1.

FIG. 8 and FIG. 9 show the flow of the fault recovery processing of the case, in which one disk subsystem 17 or 18 is faulty.

In a fault recovery processing 50, as shown in FIG. 8, at Step 80, the disk subsystem 17 (or 18) connected to the disk interface controller 15 (or 16) of the closed path is replaced by a new normal disk subsystem, or the faulty portion of the disk subsystem 17 (or 18) is repaired. At Step 81, the controlling computer 10 checks the state (especially, the state of the data stored in the disk drive) of the disk subsystem through the internal controller 8. At Step 82, it is decided as the check result by the controlling computer 10 whether or not the state of the disk subsystem is identical to that at the fault time. The decision result of Step 82 is YES, in case the fault is eliminated by turning ON the power of the faulty disk subsystem again. In case the faulty disk subsystem is replaced by an other disk subsystem, on the contrary, the decision result of Step 82 is NO.

In case the decision result of Step 82 is YES, at Step 83, the common memory 8A in the internal controller 8 is set by the controlling computer 10 with the ratio of the data recovery processing to the I/O processing. Here, the data recovery processing is to recover the data left undoubted, by executing the past data write instruction, which has not been executed on the faulty disk subsystem. The ratio of the data recovery processing set at Step 83 designates what load distribution the processing of the I/O instruction from the host computer 1 and the recovery processing of the undoubted data are to be executed for within the data doubling device 3. If the host computer 1 is now inactive, for example, the aforementioned ratio can be set to 100% (i.e., exclusively for the data recovery processing). If the host computer 1 is now active, on the contrary, that ratio will be such a suitable value, e.g., 30% or 50% as will not trouble the business of the host computer. 1 seriously. After this ratio was set, the internal controller 8 is instructed at Step 84 by the controlling computer 10 to execute the fault recovery processing.

At Step 85, the data, which are stored in the disk subsystem 18 (or 17) on the side of the normal communication path 12 (or 11) but not doubled yet, are copied by the control of the I/O monitor 6 to the disk subsystem 17 (or 18) on the closed communication path 11 (or 12) in accordance with the set ratio of the data recovery processing. Where the undoubted data are stored is grasped with reference to the I/O management information (e.g., the write address) of the data write instruction, which is stored in the I/O monitor memory 7 from the fault time to the present time at Step 48 shown in FIG. 5. After this, the control advances to a routine F shown in FIG. 9.

In the routine F, as shown in FIG. 9, when the copy of all the undoubted data is completed at Step 91, the I/O monitor 6 opens the closed communication path 11 (or 12) at Step 92, and the internal controller 8 notifies the controlling computer 10 of the recovery processing end at Step 93. At Step 94, the I/O doubling controller 5 returns its action mode from the pass-through mode to the data doubling mode. As a result, the data doubling processing is reopened, as has already been described.

In case the decision result of Step 82 shown in FIG. 8 is NO, the control advances to a routine G shown in FIG. 9. In the routine G, at Step 88, the ratio of the data recovery processing to the I/O processing is set in the common memory 8A in the internal controller 8 by the controlling computer 10. At Step 89, the internal controller 8 is instructed by the controlling computer 10 to execute the fault recovery processing. Then, at Step 90, in accordance with the set ratio of the data recovery processing, all the data stored in the disk subsystem 18 (or 17) on the side of the normal communication path 12 (or 11) are copied under the control of the I/O monitor 6 to the disk subsystem 17 (or 18) of the closed communication path 11 (or 12). When the copy of all the data is completed at Step 91, the I/O monitor 6 opens the closed communication path 11 (or 12) at Step 92, and the internal controller 8 notifies the controlling computer 10 of the recovery processing end at Step 93. At Step 94, the I/O doubling controller 5 returns its action mode from the pass-through mode to the data doubling mode. As a result, the data doubling processing is reopened, as has already been described.

According to the embodiment thus far described, the data can be doubled even if the host computer 1 does not have the data doubling control function. Moreover, the data can be doubled and restored without using the resources of the host computer 1. Even in case the data doubling device 3 is faulty, moreover, there is a small danger from the loss of data. Even in case either of the two disk subsystems is faulty, moreover, the business processing of the host computer 1 can be continued by using the normal one of the disk subsystems. This last advantage cannot be attained by the doubling system of the related art using the method, in which the data of the main storage system are copied to the subsidiary storage system by using the main and subsidiary storage systems.

Figure 10:
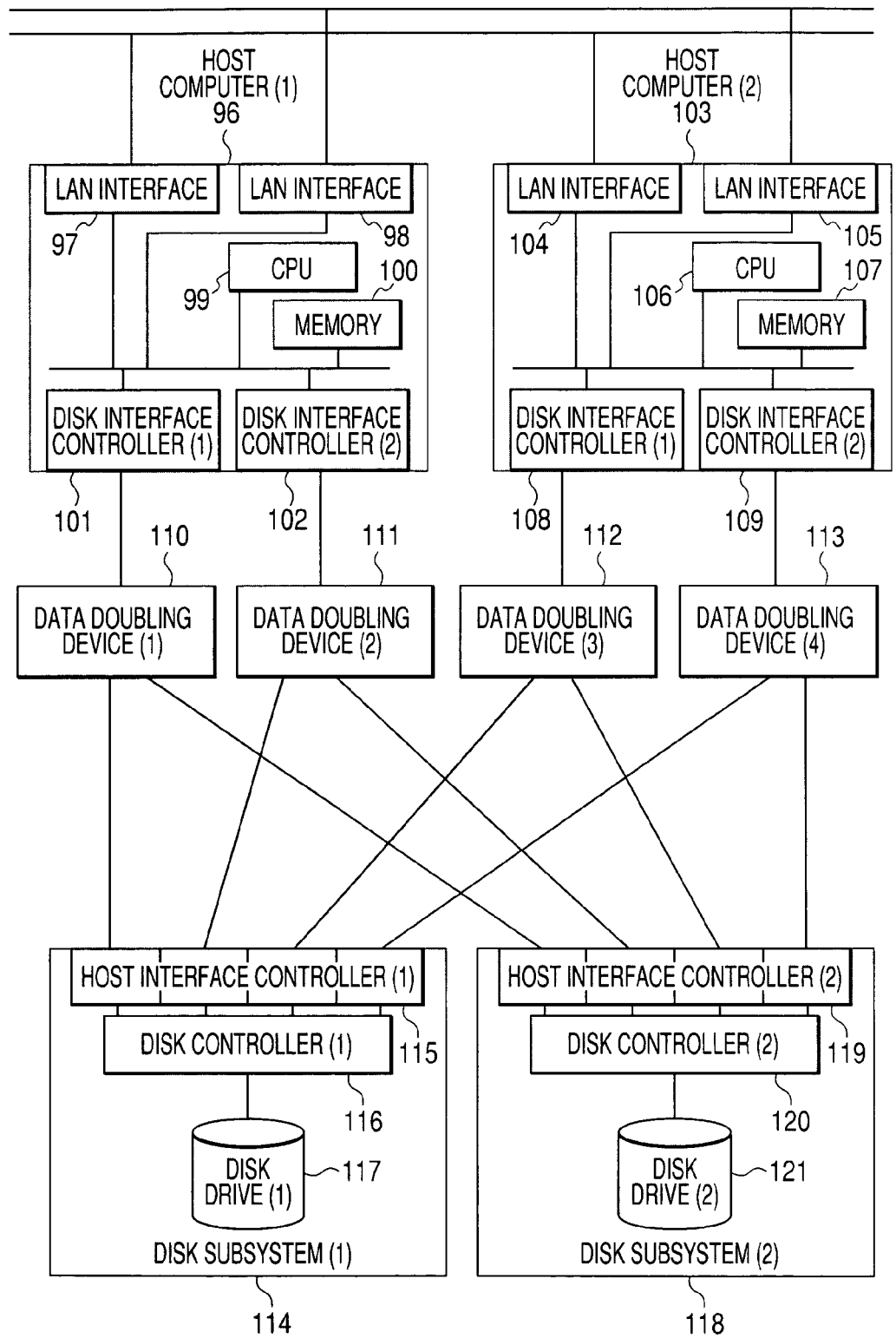
FIG. 10 is a block diagram showing the entire construction of a data multiplexing system according to another embodiment of the invention.

FIG. 10 shows the entire construction of a data multiplexing system according to another embodiment of the invention.

In the data multiplexing system shown in FIG. 10, the host computer and the data doubling device are doubled so that the system has a much higher reliability than that of the system shown in FIG. 1. Specifically, doubled host computers 96 and 103 are mutually communicatively connected to each other through doubled LANs. These doubled host computers 96 and 103 are so switched and controlled that one of them usually performs the business processing but the other performs the business processing instead when the former becomes faulty. To one host computer 96, there are connected doubled data doubling devices 110 and 111. These doubled data doubling devices 110 and 111 are so switched and controlled that one of them usually performs the data I/O processing and the other performs the data I/O processing instead when the former becomes faulty. To the other host computer 103, too, there are connected doubled data doubling devices 112 and 113. These doubled data doubling devices 112 and 113 are switched and controlled like the aforementioned ones. These four data doubling devices 110, 111, 112 and 113 are all connected to common doubled disk subsystems 114 and 118.

The host computers 96 and 103 are respectively provided with: CPUs 99 and 106; main memories 100 and 107; doubled LAN interfaces 97 and 98, and 104 and 105 to be connected to the doubled LANs; and doubled disk interfaces 101, 102, 108 and 109 to be connected to the doubled data doubling devices. The data doubling devices 110, 111, 112 and 113 individually have constructions and functions similar to those of the data doubling device 3 shown in FIG. 1. The disk subsystems 114 and 118 are respectively provided with: sets 115 and 119 of four host interface controllers to be connected to the four data doubling devices 110, 111, 112 and 113; disk controllers 116 and 120; and disk drives 117 and 121.

In this data doubling system, too, the data can be automatically doubled, like the system shown in FIG. 1, merely by the actions similar to those of the case, in which the host computers 96 and 103 are communicating with the unit disk subsystem.

Figure 11:
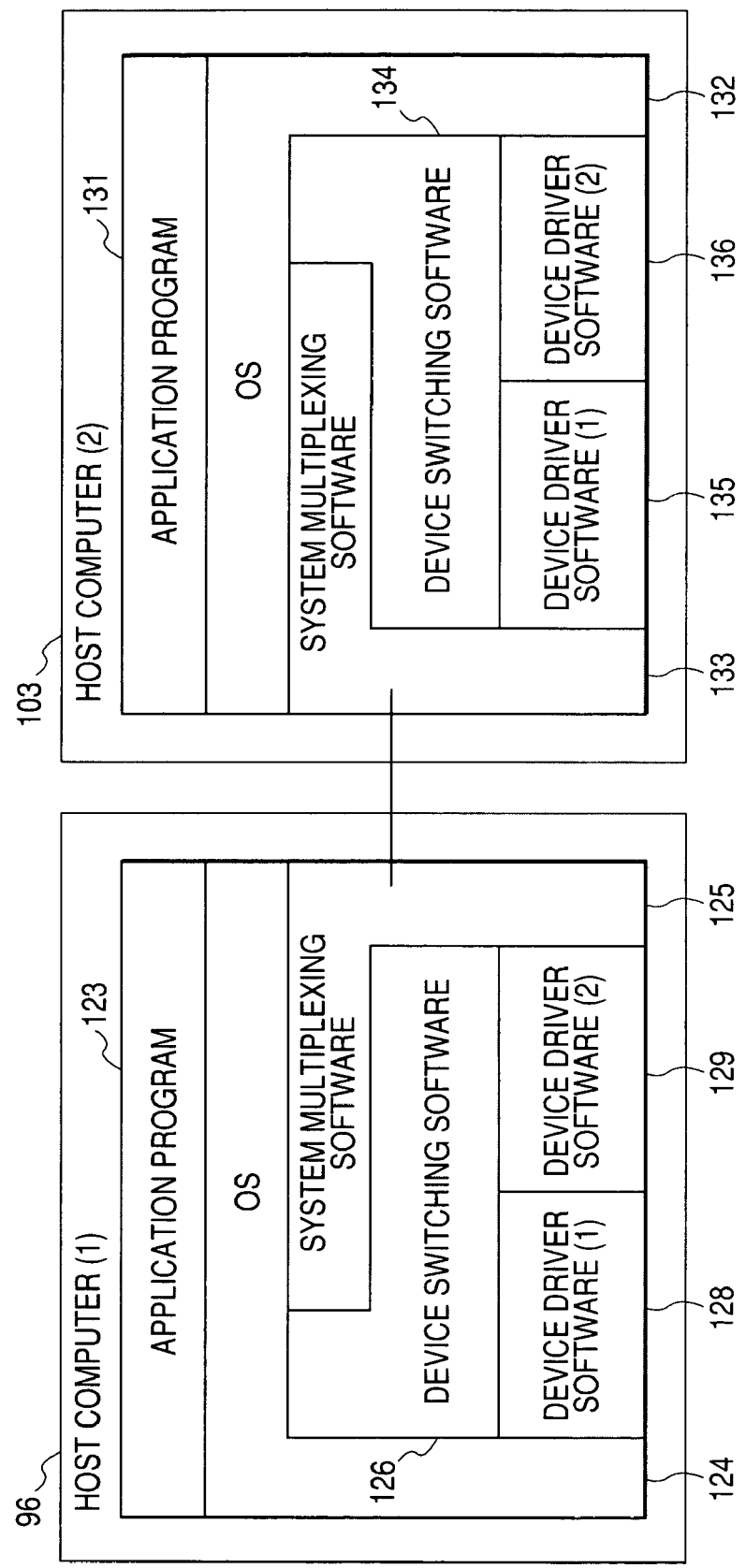
FIG. 11 is a block diagram showing the construction of softwares to be installed on host computers 96 and 103 shown in FIG. 10.

FIG. 11 shows the construction of softwares to be installed on the host computers 96 and 103 shown in FIG. 10.

As shown in FIG. 11, the host computers 96 and 103 are respectively provided with operating systems (OS) 124 and 132 and application programs 123 and 131 for performing the business processing. The host computers 96 and 103 are further respectively provided with: system multiplexing softwares 125 and 133; device switching softwares 126 and 134; and device driver softwares 128, 129, 135 and 136 for controlling the doubled data doubling devices 110 and 111, and 112 and 113, respectively. The system multiplexing softwares 125 and 133 in the host computers 96 and 103 can communicate with each other through the LANs, and control their respective OSes 124 and 132 and application programs 123 and 131 so that a predetermined one of the host computers 96 and 103 may usually perform the business processing but the other may take over the business processing instead when the predetermined one becomes faulty. The device switching softwares 126 and 134 control the switching of the device driver softwares 128, 129, 135 and 136 so that predetermined ones of the doubled data doubling devices 110, 111, 112 and 113 may be usually used but the others may be used instead when the predetermined ones become faulty.

The actions of the doubled host computers 96 and 103 and the doubled data doubling devices 110, 111, 112 and 113 are controlled with the software construction shown in FIG. 11.

Figure 12:
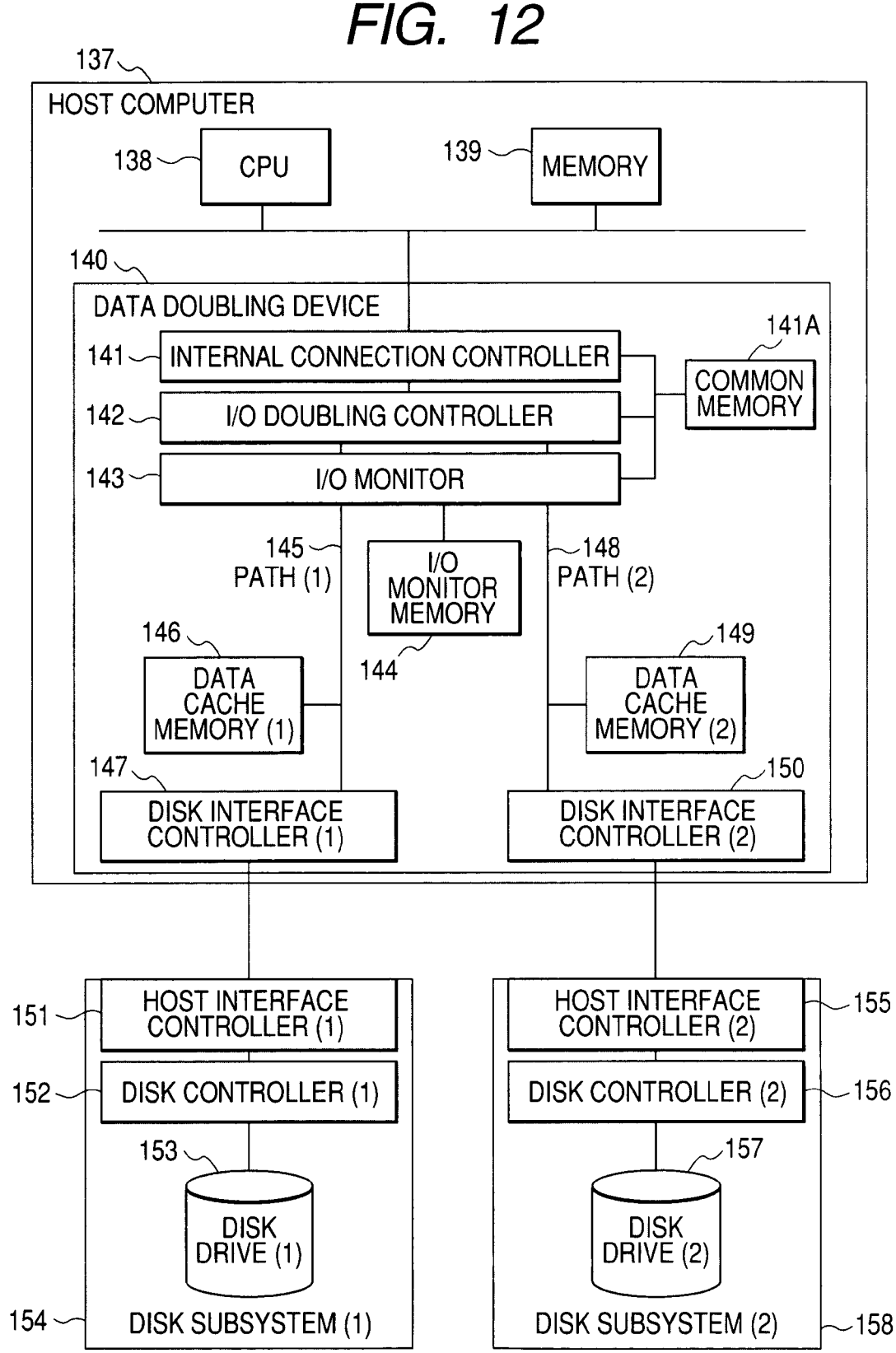
FIG. 12 is a block diagram showing the entire construction of a data multiplexing system according to still another embodiment of the invention.

FIG. 12 shows the entire construction of the data multiplexing system according to still another embodiment of the invention.

In the data multiplexing system shown in FIG. 12, a data doubling device 140 is packaged in a mode like an expanded board, for example, in a host computer 137. This data doubling device 140 is communicatively connected with a CPU 138 and a main memory 139 via an internal bus (e.g., a PCI bus) of the host computer 137. The construction and function of the data doubling device 140 are basically similar to those of the data doubling device 3 shown in FIG. 1. In this data doubling device 140, however, an internal connection controller 141 connected with the internal bus of the host computer 137 performs not only a function similar to that of the host interface controller 4 of the data doubling device 3 shown in FIG. 1 but also a function similar to those of the internal controller 8 and the external interface controller 9. This internal connection controller 141 is provided with a common memory 141A, which can be accessed to from an I/O doubling controller 142 and an I/O monitor 143. This common memory 141A is set with the initialization information and the ratio of the data recovery processing like the common memory 8A of the data doubling device 3 shown in FIG. 1. On the basis of the information set in that common memory 8A, the I/O doubling controller 142 and the I/O monitor 143 control the individual functions. These functions of the I/O doubling controller 142 and the I/O monitor 143 are similar to those of the data doubling device 3 shown in FIG. 1.

Figure 13:
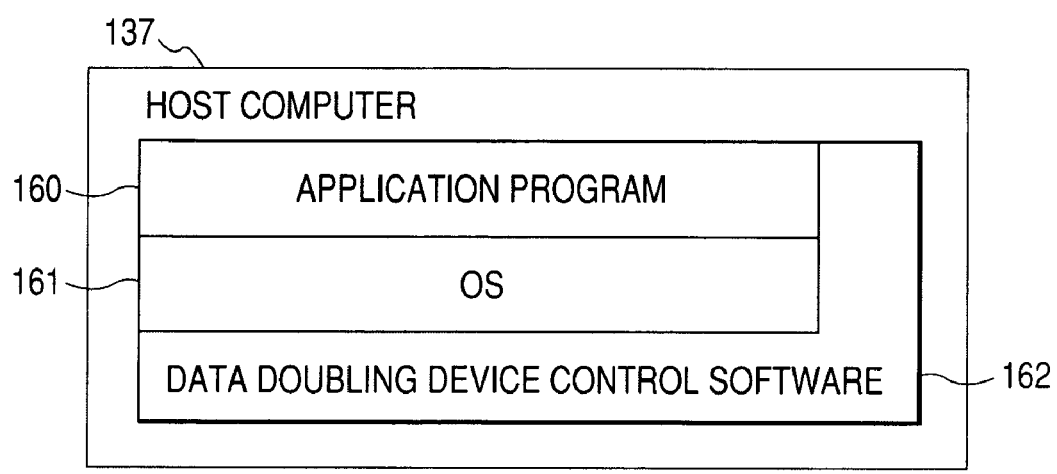
FIG. 13 is a block diagram showing the construction of a software to be installed on a host computer 137 shown in FIG. 12.

FIG. 13 shows the construction of a software to be installed on the host computer 137 shown in FIG. 12.

As shown in FIG. 13, the host computer 137 has not only an application program 160 and an OS 161 for the business processing but also a software 162 for controlling the data doubling device 140. This data doubling device control software 162 not only sends/accepts the I/O instructions and responses to the data doubling device 140 but also performs functions similar to those of the controlling computer 10 shown in FIG. 1.

Figure 14:
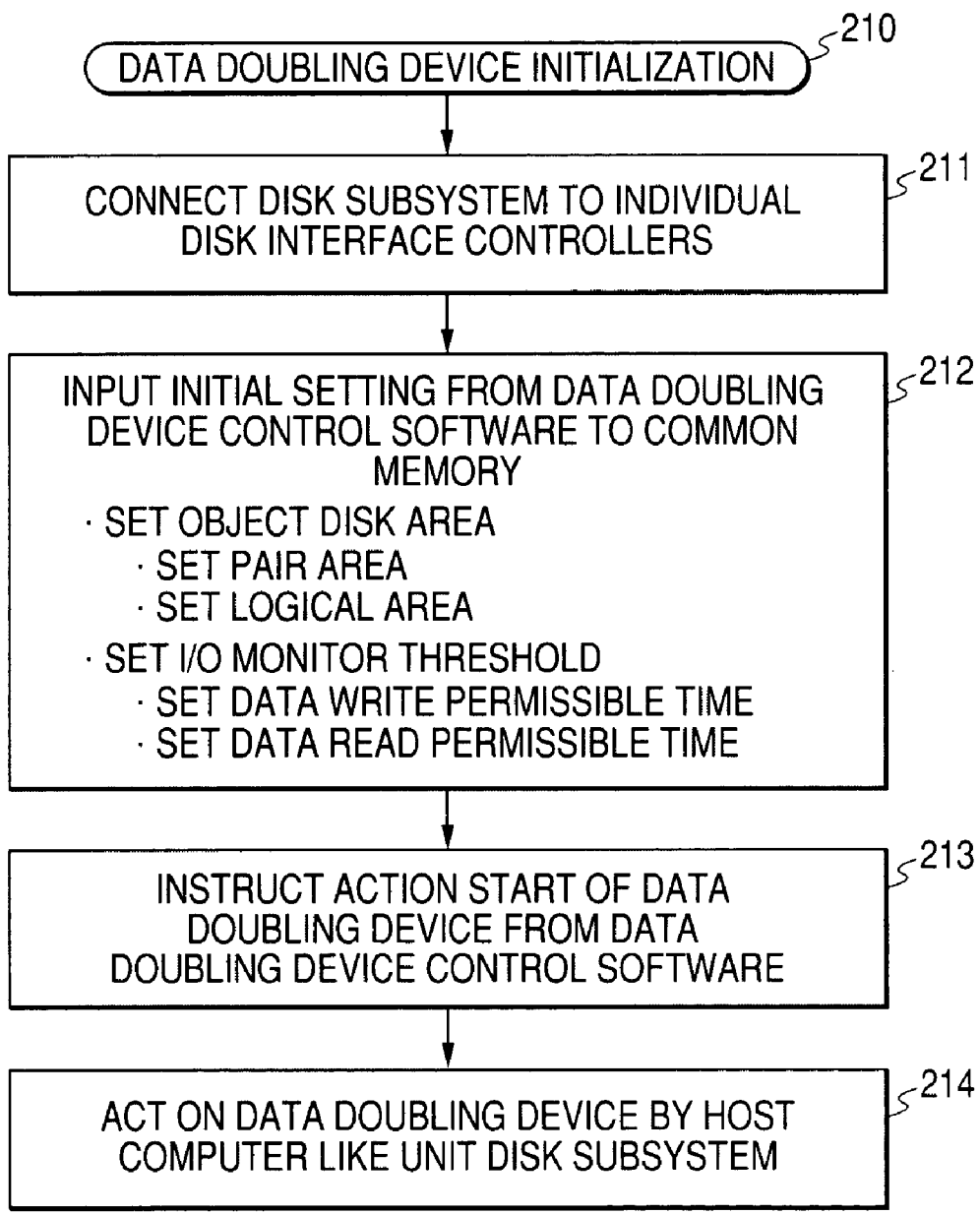
FIG. 14 is a flow chart of an initialization of a data doubling device 140.

FIG. 14 shows the flow of an initialization of the data doubling device 140.

At an initialization 210 of the data doubling device 140, as shown in FIG. 14, at Step 211, the disk subsystems 154 and 158 are communicatively connected to the disk interface controllers 147 and 150, respectively, of the data doubling device 140. At Step 212, the initialization information is set from data doubling device control software 162 into the common memory 141A of the data doubling device 140. The detail of the initialization information has already been described in connection with the system of FIG. 1. At Step 213, the action start of the data doubling device 141 is instructed from the data doubling device control software 162. In response to this instruction, at Step 214, the data doubling device 3 starts actions on the OS 161 of the host computer 137 as if it were a unit disk subsystem.

Figure 15:
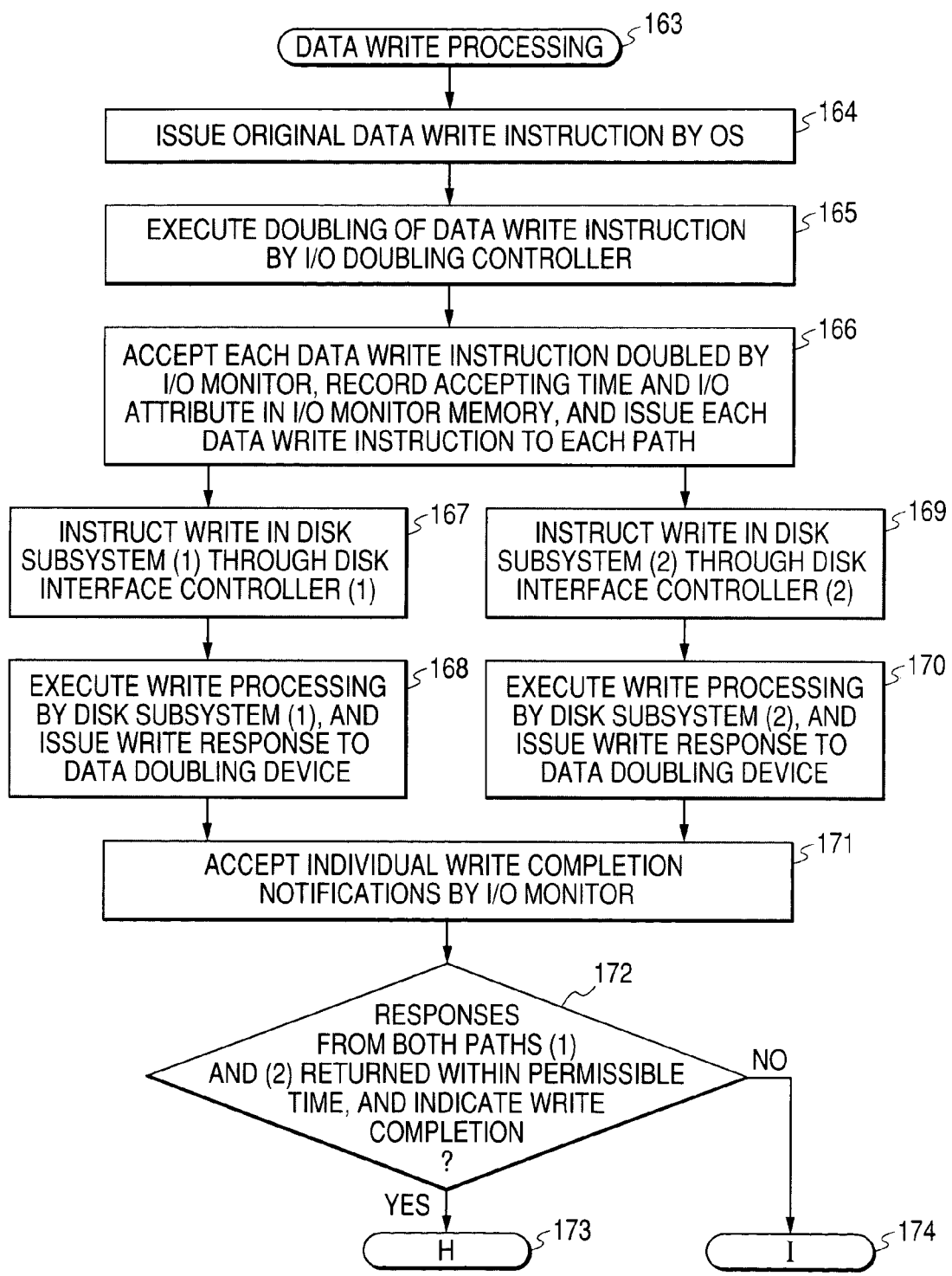
FIG. 15 is a flow chart of a data write processing in the system of FIG. 12.
Figure 16:
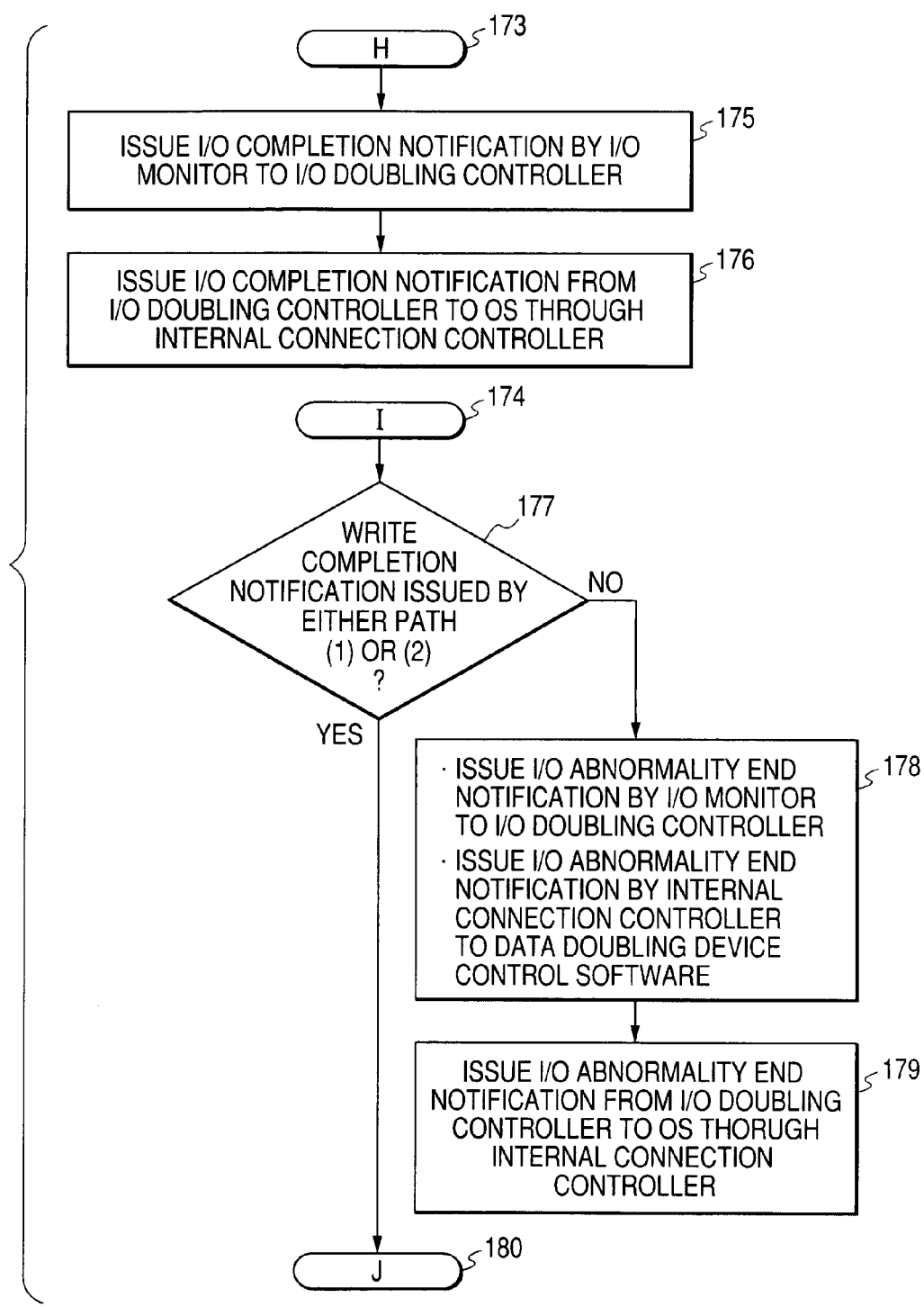
FIG. 16 is a flow chart of the data write processing in the system of FIG. 12.
Figure 17:
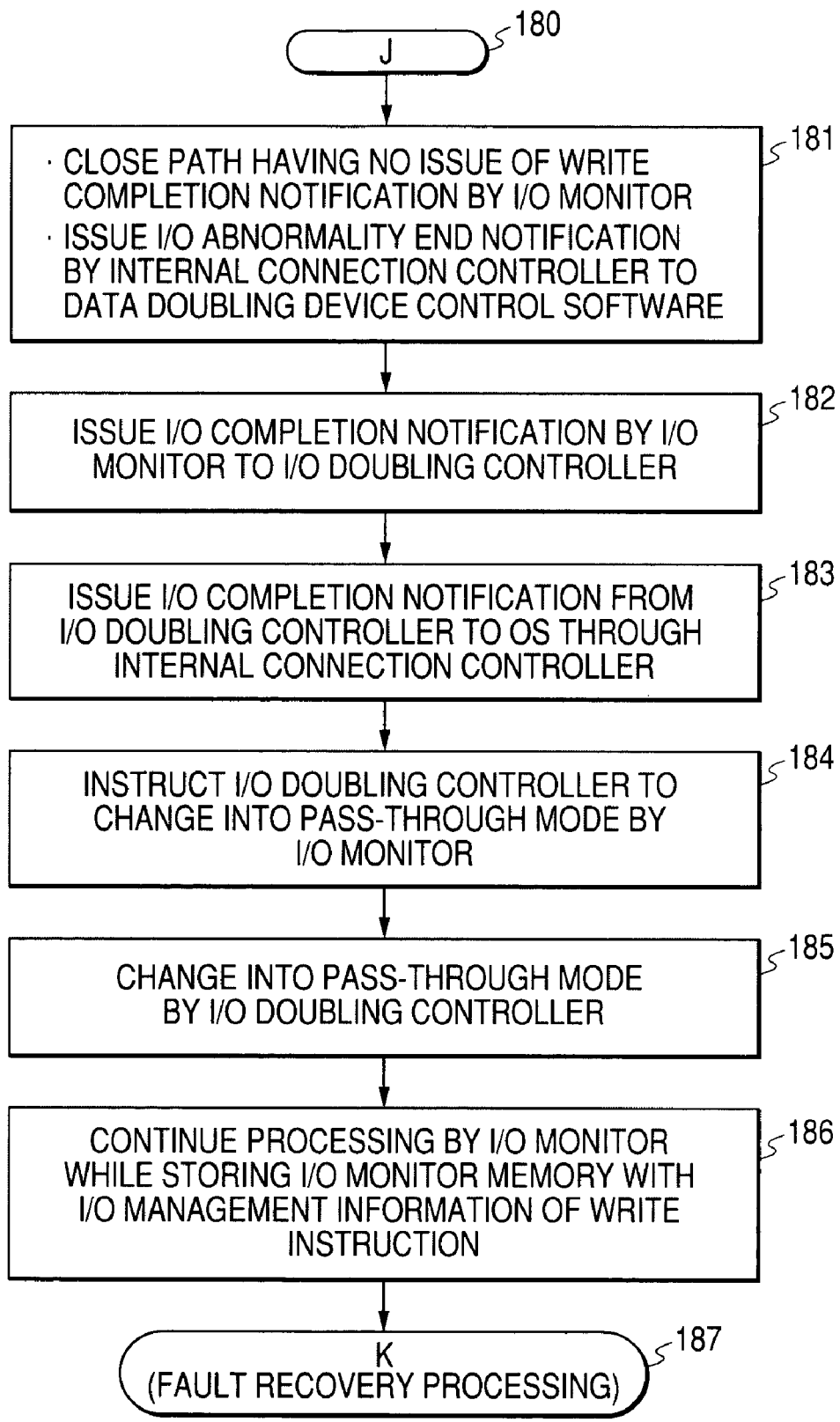
FIG. 17 is a flow chart of the data write processing in the system of FIG. 12.

FIG. 15 to FIG. 17 show the flows of the data write processing in the system of FIG. 12.

In a data write processing 163, as shown in FIG. 15, at Step 164, an original data write instruction is issued to the data doubling device 140 by the OS 161 of the host computer 137. In response to this data write instruction, the data doubling device 140 execute basically the same actions as those which have already been described in connection with the system of FIG. 1 with reference to FIG. 3 to FIG. 5. The actions different from those of the system of FIG. 1 reside mainly at the following points. Specifically, in case both the data write instructions doubled by the data doubling device 140 are normally processed by the disk subsystems 154 and 158, the I/O completion notification is issued at Step 176 of FIG. 16 from an I/O doubling controller 142 to the OS 161 of the host computer 137. In case neither of the doubled data write instructions is normally processed at the disk subsystems 154 and 158, on the contrary, the I/O abnormal end notification is sent at Steps 178 and 179 of FIG. 16 from the I/O doubling controller through the internal connection controller 141 to the data doubling control software 162 and the OS 161 of the host computer 137. In case one of the doubled data write instructions is normally processed, on the other hand, the I/O abnormal end notification is sent at Step 181 of FIG. 17 from the I/O doubling controller through the internal connection controller 141 to the data doubling control software 162, and the I/O completion notification is sent at Step 183 from the I/O doubling controller through the internal connection controller 141 to the OS 161.

Figure 18:
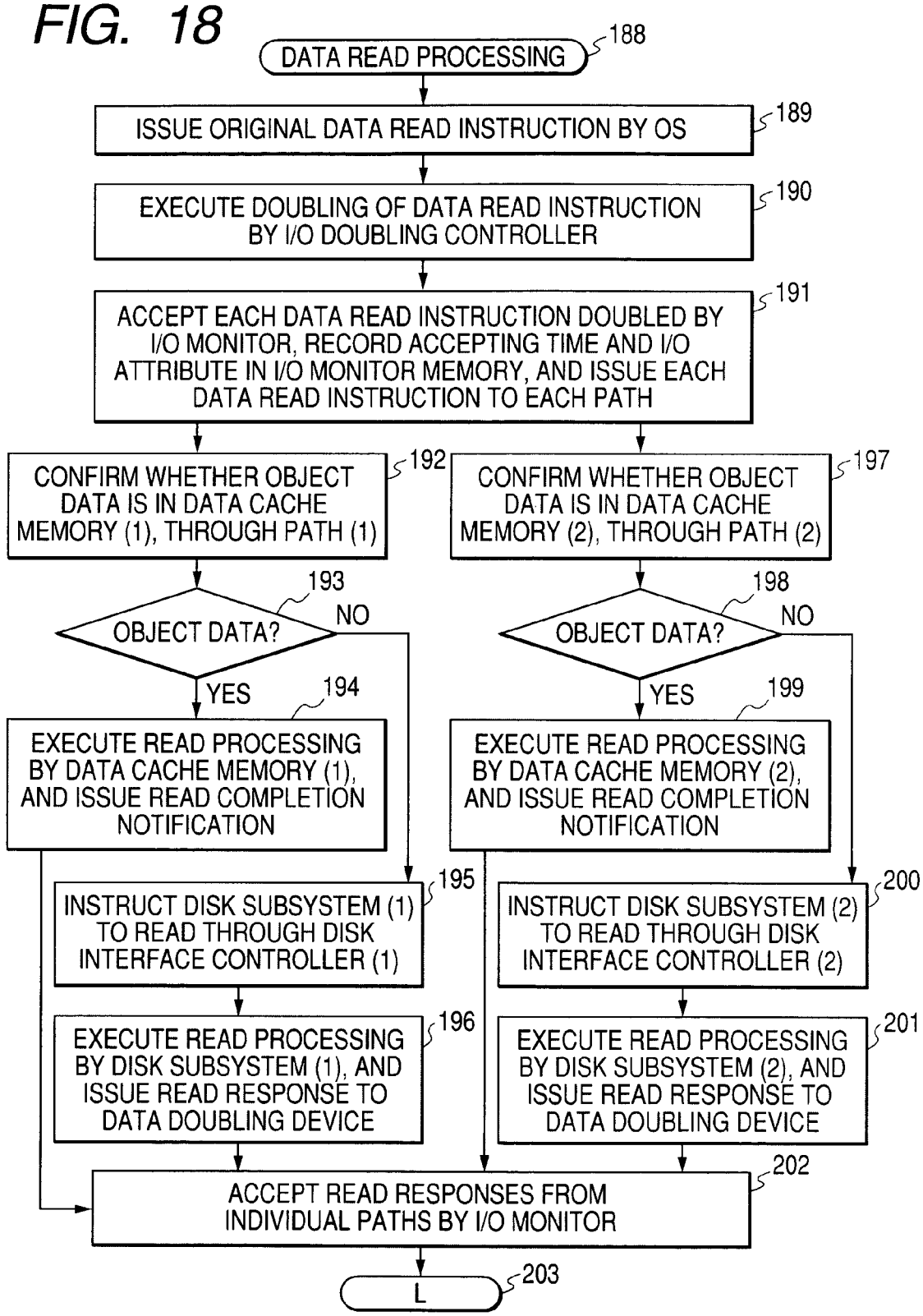
FIG. 18 is a flow chart of a data read processing in the system of FIG. 12.
Figure 19:
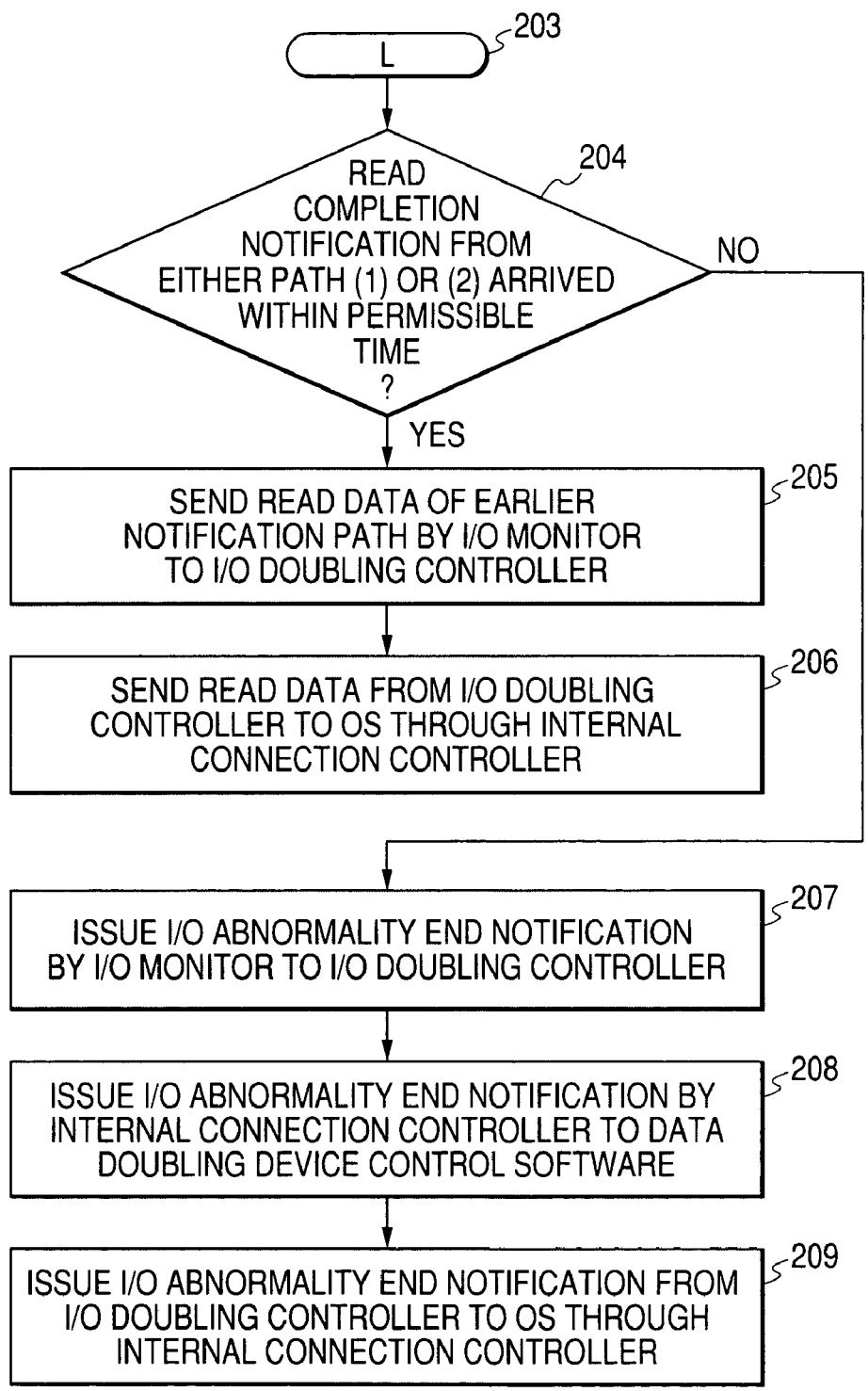
FIG. 19 is a flow chart of the data read processing in the system of FIG. 12.

FIG. 18 and FIG. 19 show the flow of the data read processing in the system of FIG. 12.

In a data read processing 188, as shown in FIG. 18, at Step 189, an original data read instruction is issued to the data doubling device 140 by the OS 161 of the host computer 137. In response to this data read instruction, the data doubling device 140 executes basically the same actions as those which have already been described in connection with the system of FIG. 1 with reference to FIG. 6 and FIG. 7. The actions different from those of the system of FIG. 1 reside mainly at the following points. Specifically, in case one of the data read instructions doubled by the data doubling device 140 is normally processed by the disk subsystems 154 or 158, the I/O completion notification is issued at Step 206 of FIG. 19 from the I/O doubling controller 142 through the internal connection controller 141 to the OS 161 of the host computer 137. In case neither of the doubled data read instructions is normally processed, on the contrary, the I/O abnormal end notification is sent at Steps 208 and 209 of FIG. 19 from the I/O doubling controller through the internal connection controller 141 to the data doubling control software 162 and the OS 161 of the host computer 137.

Figure 20:
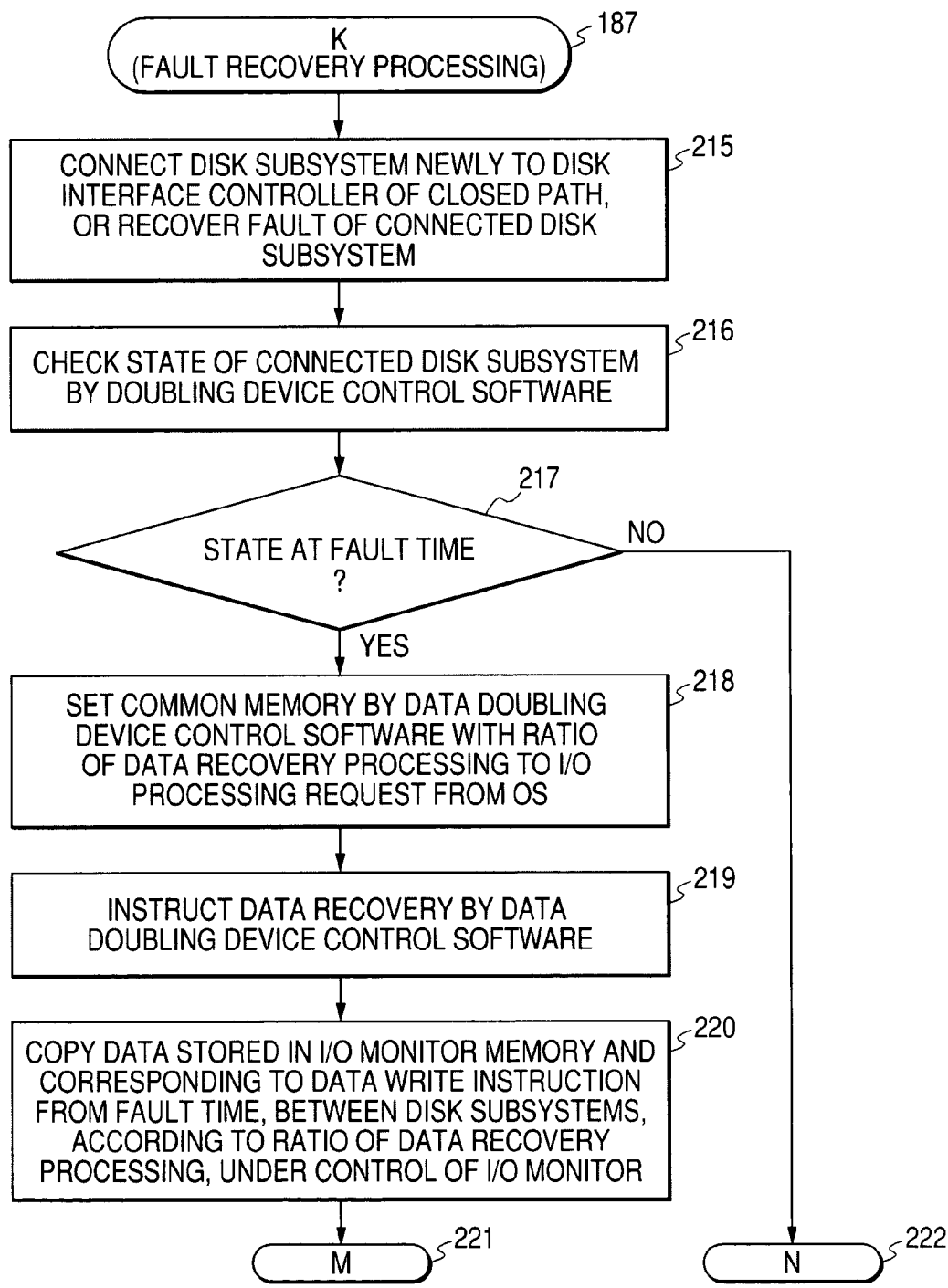
FIG. 20 is a flow chart of a fault recovery processing in the system of FIG. 12.
Figure 21:
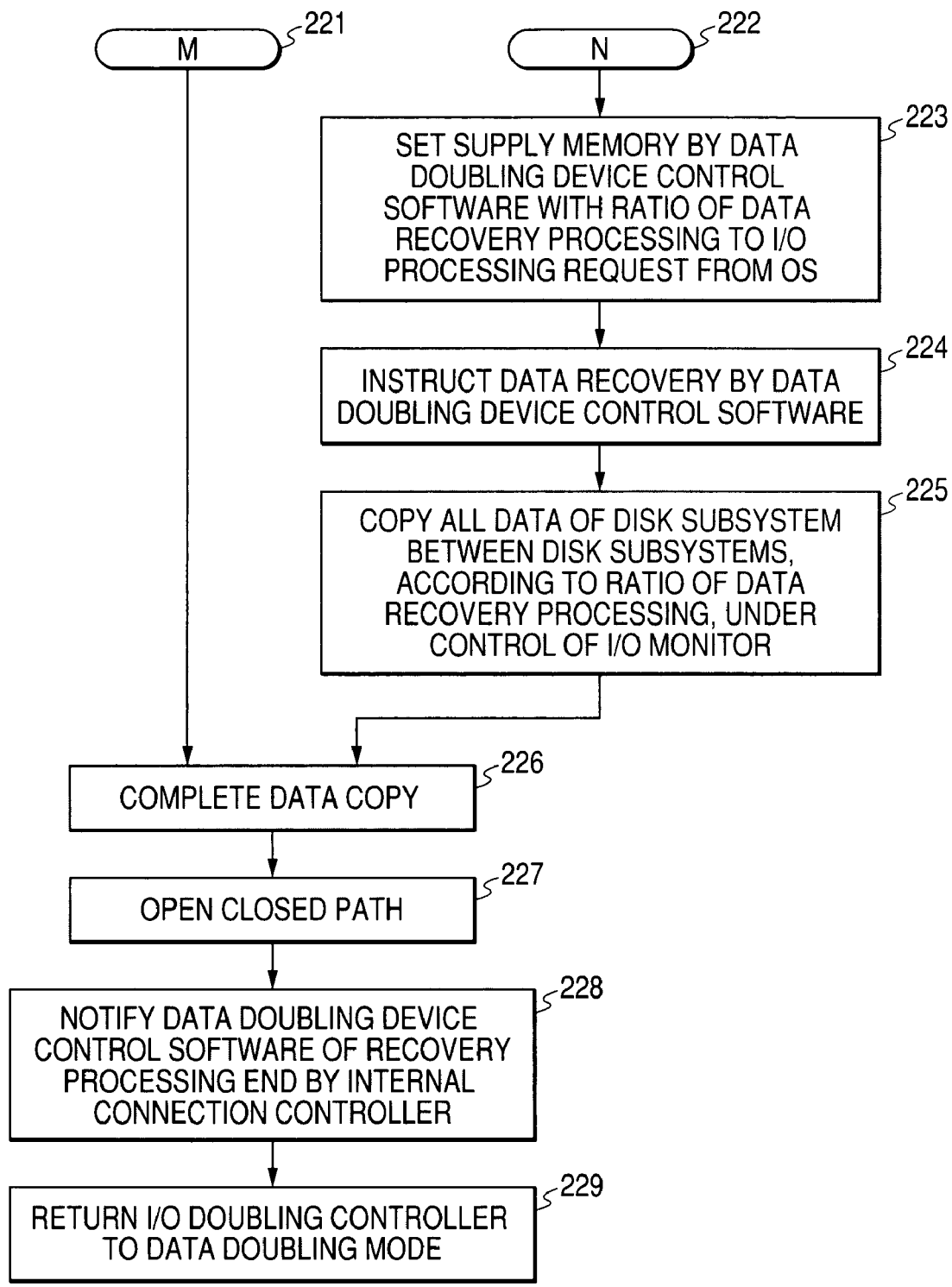
FIG. 21 is a flow chart of the fault recovery processing in the system of FIG. 12.

FIG. 20 and FIG. 21 show the flow of the fault recovery processing of the case, in which one disk subsystem 154 or 158 is faulty.

In this fault recovery processing 187, too, there are executed basically the same actions as those which have already been described in connection with the system of FIG. 1 with reference to FIG. 8 and FIG. 9. The actions different from those of the system of FIG. 1 reside mainly at the following points. Specifically, the state of the disk subsystem on the side of the communication path closed at Step 216 of FIG. 20 is checked by the data doubling device control software 162 of the host computer 137. Moreover, the settings of the ratios of the data recovery processings of Step 218 of FIG. 20 and Step 223 of FIG. 21, and the issues of the data recovery instructions at Step 219 of FIG. 20 and Step 224 of FIG. 21 are also performed by the data doubling device control software 162.

In the aforementioned data doubling system of FIG. 12, the data doubling device control software in the host computer 137 performs the function as the controlling computer 10 in the system shown in FIG. 1. Therefore, the resources of the host computer 137 are slightly used for the initialization of the data doubling device 140 and for the processing to cope with the case of a fault in the disk subsystem 154 or 158. However, this slight use hardly exerts a substantial influence on the business processing of the host computer 137.

Figure 22:
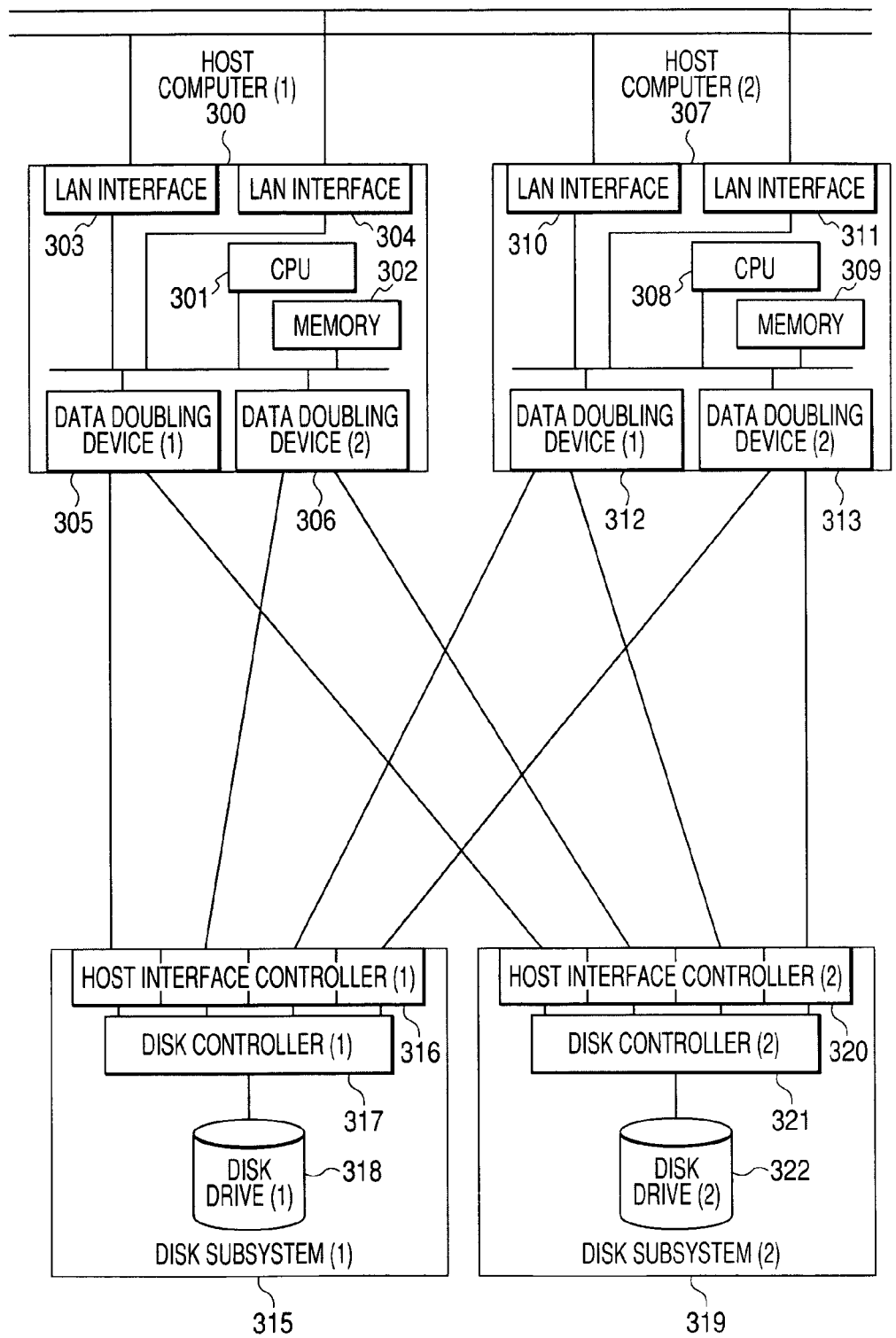
FIG. 22 is a block diagram showing the entire construction of a data multiplexing system according to still another embodiment of the invention.

FIG. 22 shows the entire construction of a data multiplexing system according to still another embodiment of the invention.

In order to enhance there liability, the data multiplexing system shown in FIG. 22 is provided with doubled host computers 300 and 307, which are so connected through doubled LANs to each other as to communicate with each other. The doubled host computers 300 and 307 are so controlled that a predetermined one of them usually performs the business processing but the other takes over the business processing instead when the predetermined one becomes faulty. In these host computers 300 and 307, respectively, there are assembled doubled data doubling devices 305 and 306, and 312 and 313. Any of these data doubling devices 305, 306, 312 and 313 is connected with common doubled disk subsystems 315 and 319. The construction and function of each of the data doubling devices 305, 306, 312 and 313 are similar to those of the data doubling device 140, which is assembled in the host computer 137 shown in FIG. 12. The doubled data doubling devices 305 and 306, and 312 and 313 are so controlled that a predetermined one of the pair usually acts but the other acts instead when the predetermined one becomes faulty.

Figure 23:
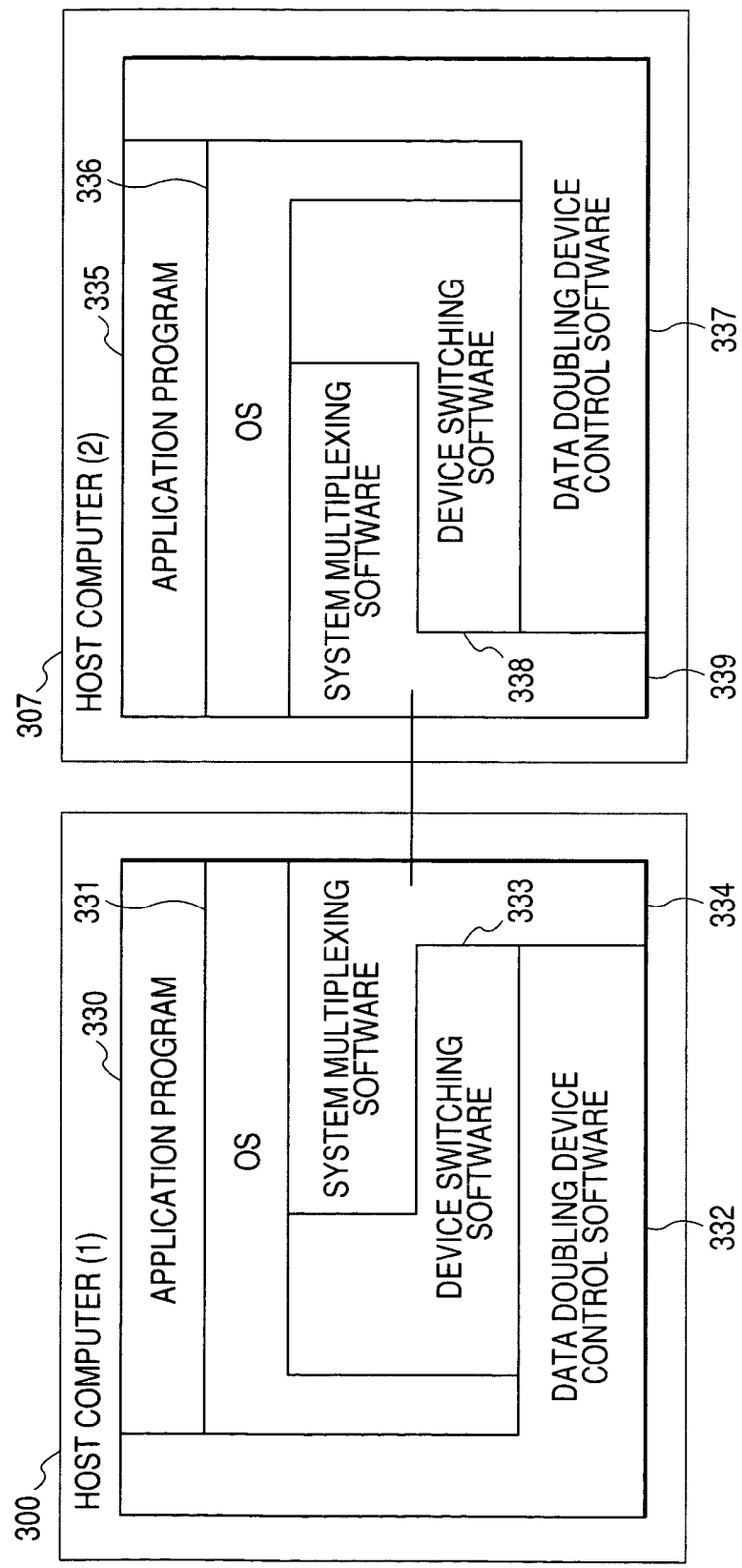
FIG. 23 is a block diagram showing the construction of softwares to be installed on host computers 300 and 307 shown in FIG. 22.

FIG. 23 shows the construction of softwares to be installed on host computers 300 and 307 shown in FIG. 22.

As shown in FIG. 23, the host computers 300 and 307 are respectively provided with application programs 330 and 335 and OSes 331 and 336 for performing the business processing. The host computers 300 and 307 are respectively provided with system multiplexing softwares 334 and 339, device switching softwares 333 and 338, and data doubling device control softwares 332 and 337. The system multiplexing softwares 334 and 339 can communicate with each other through a LAN and control their respective OSes 331 and 336 and application programs 330 and 335 so that a predetermined one of the host computers 300 and 307 usually performs the business processing but the other takes over the business processing instead when the predetermined one becomes faulty. The device switching softwares 333 and 338 control the data doubling device control softwares 332 and 337, respectively, so that they usually use predetermined ones of the doubled data doubling devices 305 and 306, and 312 and 313 but use the others instead when the predetermined ones become faulty. The data doubling device control softwares 332 and 337 control ones of the doubled data doubling devices 305 and 306, and 312 and 313 selectively under the control of the device switching softwares 333 and 338. The control functions between each of the doubling device control softwares 332 and 337 and the data doubling devices 305 and 306, and 312 and 313 are similar to those between the doubling device control software 162 and the data doubling device 140 in the system shown in FIG. 12 and FIG. 13.

Figure 24:
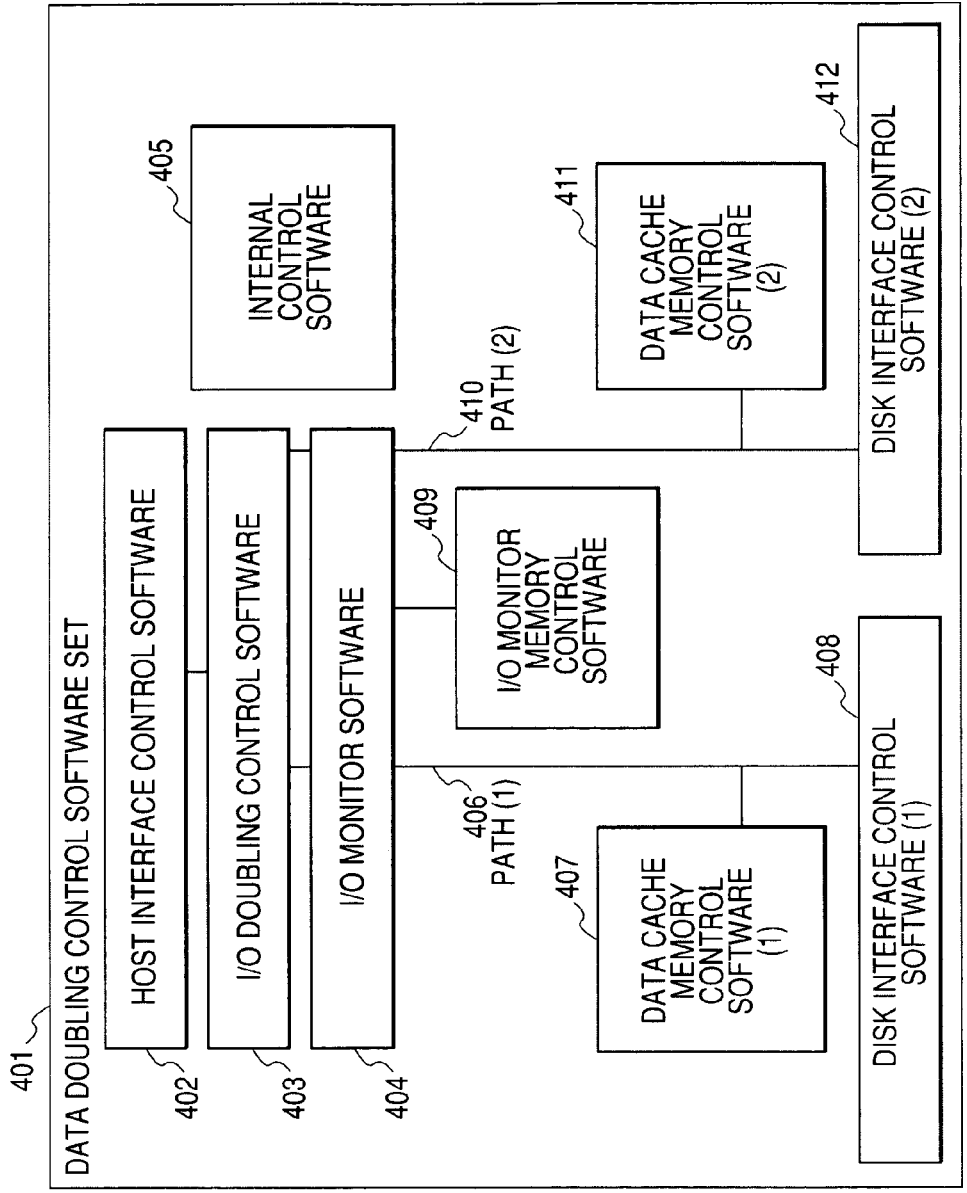
FIG. 24 is a block diagram showing the construction of a data doubling control software set to be applied to a data multiplexing system according to still another embodiment of the invention.

FIG. 24 shows the construction of a data doubling control software set to be applied to a data multiplexing system according to still another embodiment of the invention.

A control software set 401 shown in FIG. 24 is connected, like a fibre channel switch, with the host computer and a storage system and is installed on a hardware device (or a computer system) independent of those host computer and storage system, so that the hardware device can exhibit functions similar to those of the data doubling device 3 shown in FIG. 1. In this case, the memory owned by the hardware device can also be used as the common memory 8A, the I/O monitor memory 7 and the data cache memories 13 and 14 of the data doubling device 3 shown in FIG. 1.

As shown in FIG. 24, this data doubling control software set 401 is provided with a host interface control software 402, an I/O doubling control software 403, an I/O monitor software 404, an internal control software 405, an I/O monitor memory control software 409, data cache memory control softwares 407 and 411 and disk interface control softwares 408 and 412. The host interface control software 402, the I/O doubling control software 403, the I/O monitor software 404, the internal control software 405 and the disk interface control softwares 408 and 412 can cause the hardware device to perform the actions of the host interface controller 4, the I/O doubling controller 5, the I/O monitor 6, the internal controller 8 and the disk interface controllers 15 and 16 shown in FIG. 1. Moreover, the I/O monitor memory control software 409 retains a memory area corresponding to the I/O monitor memory 7 shown in FIG. 1, over the memory in the hardware device thereby to cause the hardware device to perform the action to control the access to the memory area from the I/O doubling control software 403 and the I/O monitor software 404. The data cache memory control softwares 407 and 411 retain a memory area corresponding to the data cache memories 13 and 14 shown in FIG. 1, over the memory in the hardware device thereby to cause the hardware device to perform the action to control the access to the memory area from the I/O monitor software 404 and the disk interface controllers 15 and 16.

The data doubling control software set 401 shown in FIG. 24 is installed in a computer system such as the fibre channel switch, for example, for controlling the communicative connections between a number of host computers and a number of storage systems and is made to function as a data doubling device so that the load for processing the data doubling control of the numerous host computers is lightened and so that the reliability of the storage systems is improved.

Figure 25:
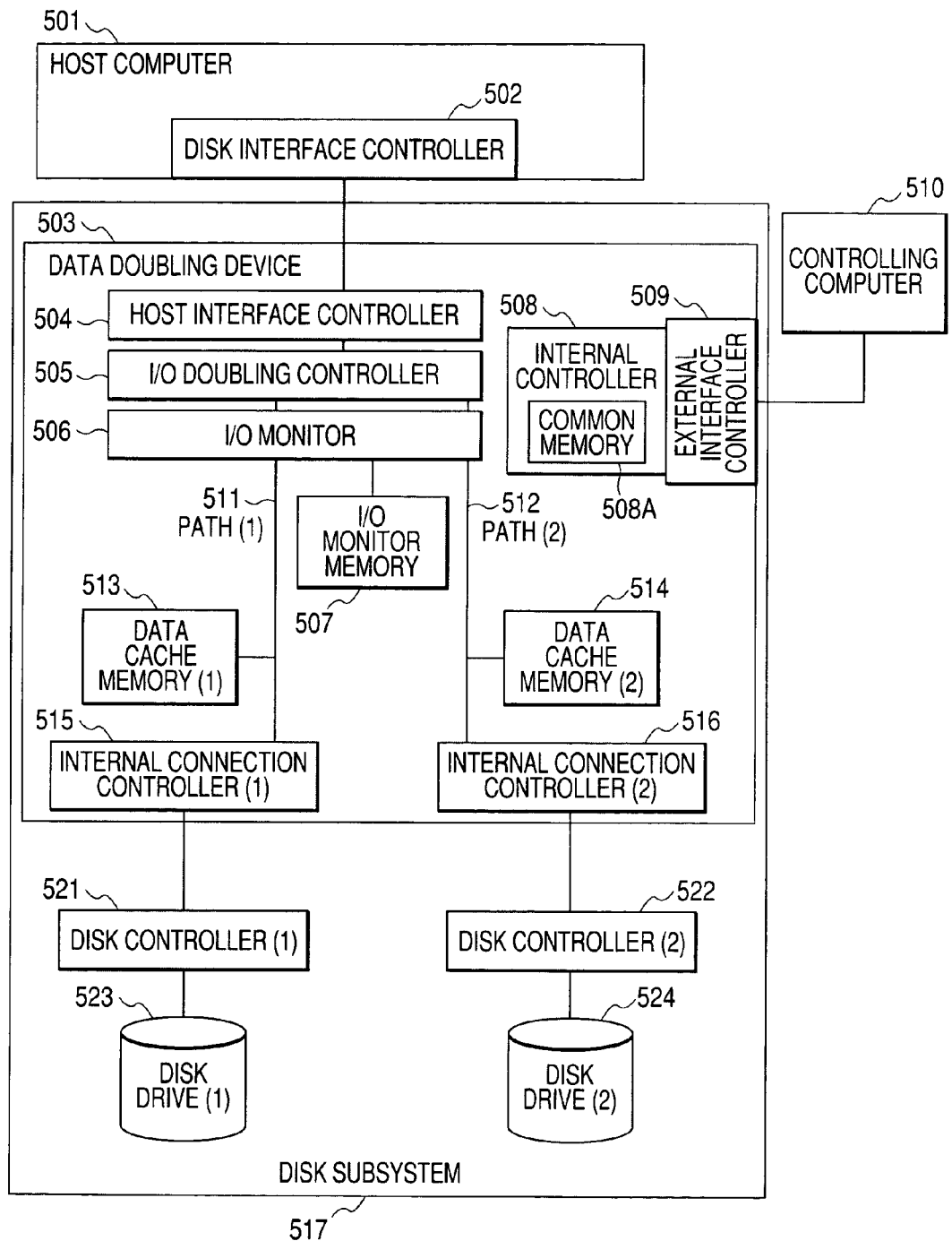
FIG. 25 is a block diagram showing the entire construction of a data multiplexing system according to still another embodiment of the invention.

FIG. 25 shows the entire construction of a data multiplexing system according to still another embodiment of the invention.

In the data multiplexing system shown in FIG. 25, a data doubling device 503 is assembled in a disk subsystem 517. This disk subsystem 517 includes at least two disk controllers 521 and 522 and at least two disk drives 523 and 524 connected to the former. Moreover, the two disk controllers 521 and 522 are connected with the data doubling device 503. The construction and function of the data doubling device 503 are basically similar to those of the data doubling device 3 shown in FIG. 1.

Figure 26:
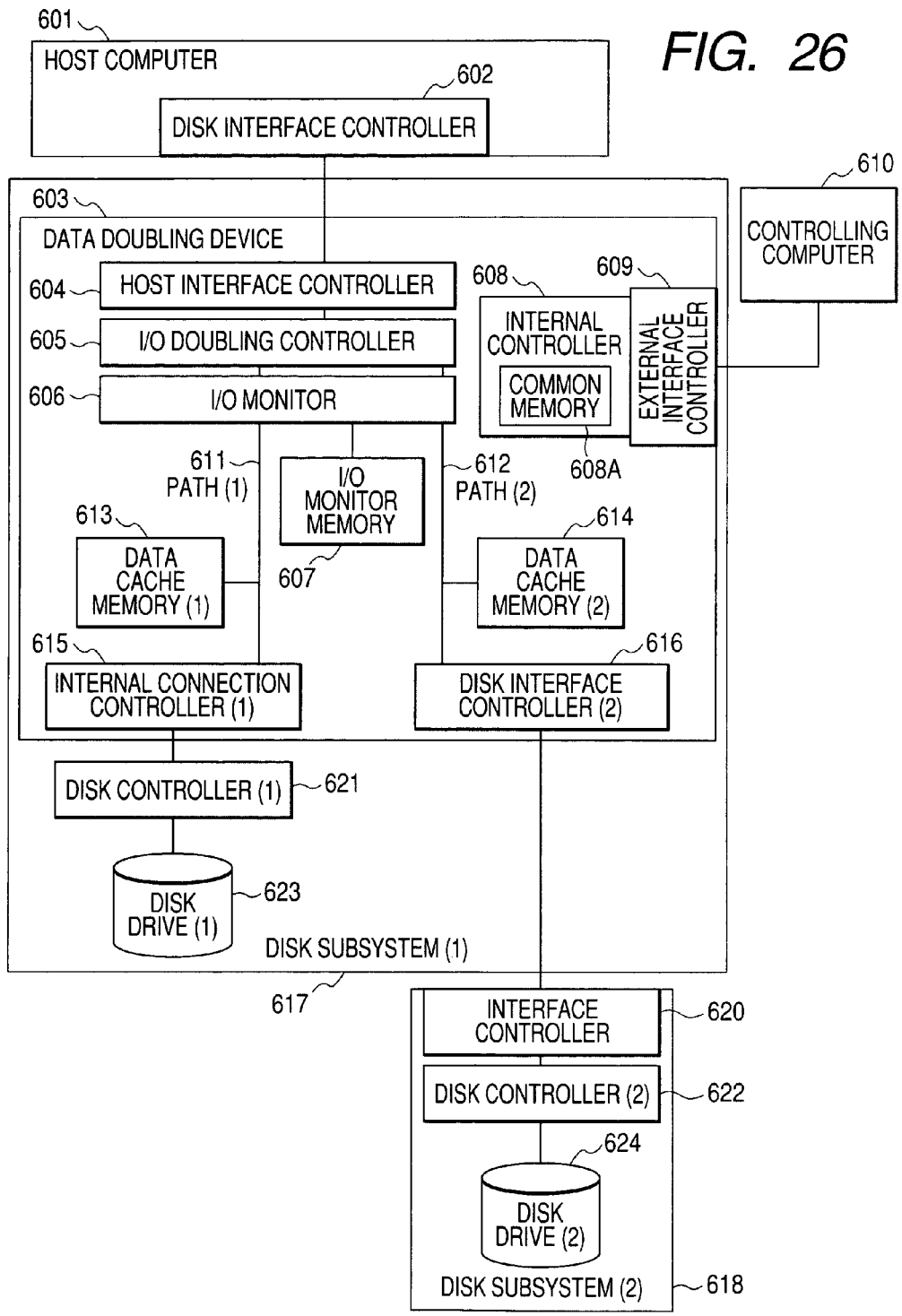
FIG. 26 is a block diagram showing the entire construction of a data multiplexing system according to still another embodiment of the invention.

FIG. 26 shows the entire construction of a data multiplexing system according to still another embodiment of the invention.

In the data multiplexing system shown in FIG. 26, a data doubling device 603 is assembled in one disk subsystem 617. In this disk subsystem 617, there are at least one disk controller 621 and at least one disk drive 623 connected with the former. Moreover, the disk controller 621 is connected with the data doubling device 603. There is another disk subsystem 618, which is also connected to the data doubling device 603. The construction and function of the data doubling device 603 are basically similar to those of the data doubling device 3 shown in FIG. 1.

The embodiments of the invention have been described heretofore but are merely examples for describing the invention, and they should not be construed to limit the scope of the invention to only those embodiments. The invention can be practiced in other various modes without departing from the gist thereof. For example, the invention can be applied not only to the case of doubling the data but also to the case of tripling or more the data.

What is claimed is:

1. A data multiplexing system comprising:
a host device, having a processor for running an application program and an operating system, to issue an original data write/read instruction;
a data multiplexing device connected to said host device;
first and second storage systems individually connected to said data multiplexing device for storing data for said host host device; and
a data recovery controller for instructing said data multiplexing device to execute a data recovery processing,
wherein said data multiplexing device includes:
a host interface controller for making a communication connection to said host device;
first and second slave interface units for making communication connections to said first and second storage systems, respectively;
a multiplexing controller for accepting the original data write/read instruction from said host device through said host interface controller and for creating first and second data write/read instructions by multiplexing said original data write/read instruction;
a monitor memory; and
a monitor for storing in said monitor memory time information and a data I/O address of said first and second data write/read instructions, for issuing said first and second data write/read instructions, respectively, to said first and second storage systems through said first and second slave interface units, for accepting responses individually from said first and second storage systems to said first and second data write/read instructions, for creating responses to said original data write/read instruction based on the responses from said first and second storage systems, and for returning the created responses to said host device,
wherein said monitor decides based on said time information stored in said monitor memory whether or not the responses from said first and second storage systems have arrived within a predetermined permissible time, and creates a response to said original data write/read instruction in accordance with a result of the decision,
wherein said multiplexing controller creates first and second data write instructions, if said original data write/read instruction is a data write instruction, by multiplexing said original data write instruction,
wherein said monitor issues said first and second data write instructions, respectively, to said first and second storage systems, creates data write/read completion notifications as a response to said original data write instruction after a response indicating a write completion notification has arrived from said first and second storage systems within said permissible time, and returns said data write/read completion notifications to said host device,
wherein said monitor creates a data write/read completion notification as the response to said original data write instruction, and if the response indicating said write completion notification has arrived from said first storage system within said permissible time, but the response indicating said write completion notification has not arrived from said second storage system within said irresistible time, returns said data write/read completion notification to said host device, decides that the data write processing has abnormally ended in said second storage system, and sends an abnormal end notification on said second storage system to said data recovery controller.

2. A data multiplexing system according to claim 1, wherein said monitor sends a first data write instruction based on a new original data write instruction, to said first storage system but not a second data write instruction based on said new original data write instruction, to said second storage system, each time said new original data write instruction is issued from said host device after it decided that the data write processing in said second storage system abnormally ended, and stores said monitor memory with the time information and the data write address of a first data write instruction according to said new original data write instruction, and
wherein said monitor extracts the unmultiplexed data, which are stored in said first storage system but not in said second storage system, in case it is instructed to execute the data recovery processing from said data recovery controller after it decided that the data write processing in said second storage system was abnormally ended, on the basis of the time information and the data write address of said first data write instruction, which have been issued and are stored in said monitor memory, and copies said extracted unmultiplexed data from said first storage system to said second storage system.

3. A data multiplexing system according to claim 2, wherein said data recovery controller instructs said data multiplexing device not only the execution the data recovery processing but also the ratio of said data recovery processing to the processing of the original data write/read instruction issued from said host device, and wherein said monitor controls the distribution of the loads in said data multiplexing device between the processing of said original data write/read instruction and the processing to copy said unmultiplexed data from said first storage system to said second storage system, in accordance with said ratio instructed by said data recovery controller.

4. A data multiplexing system according to claim 1, wherein said multiplexing controller creates first and second data read instructions, if said original data write/read instruction is a data read instruction, by multiplexing said original data read instruction, and wherein said monitor issues said first and second data read instructions, respectively, to said first and second storage systems, and returns, after the response having the read data arrived from either of said first and second storage systems within said permissible time, said read data as the response to said original data read instruction, to said host device.

5. A data multiplexing system comprising:
a host device, having a processor for running an application program and an operating system, to issue an original data write/read instruction;
a data multiplexing device connected to said host device;
first and second storage systems individually connected to said data multiplexing device for storing data for said host device,
wherein said data multiplexing device includes:
a host interface controller for making a communication connection to said host device,
first and second slave interface units for making communication connections to said first and second storage systems, respectively,
a multiplexing controller for accepting the original data write/read instruction from said host device through said host interface controller and for creating first and second data write/read instructions by multiplexing said original data write/read instruction,
a monitor memory, and
a monitor for storing in said monitor memory time information and a data I/O address of said first and second data write/read instructions, for issuing said first and second data write/read instructions, respectively, to said first and second storage systems through said first and second slave interface units, for accepting responses individually from said first and second storage systems to said first and second data write/read instructions, for creating responses to said original data write/read instruction based on the responses from said first and second storage systems, and for returning the created responses to said host device,
wherein said monitor decides based on said time information stored in said monitor memory whether or not the responses from said first and second storage systems have arrived within a predetermined permissible time, and creates a response to said original data write/read instruction in accordance with a result of the decision,
wherein said data multiplexing device further includes first and second data cache memories assigned to said first and second storage systems, respectively,
wherein said multiplexing controller creates first and second data write instructions, in case said original data write/read instruction is a data write instruction, by multiplexing said original data write instruction,
wherein said monitor accepts said first and second data write instructions from said multiplexing controller, and issues said first and second data write instructions to said first and second storage systems instantly without accessing to said first and second data cache memories, wherein said multiplexing controller creates first and second data read instructions, if said original data write/read instructions are a data read instruction, by multiplexing said original data read instruction, and wherein said monitor accepts said first and second data read instructions from said multiplexing controller, searches the object data of said first and second read instructions, respectively, from said first and second data cache memories, and issues said first and second data read instructions, respectively, to said first and second storage systems in case said object data are not individually found from said first and second data cache memories.

6. A data multiplexing system according to claim 1, further comprising:
a host computer having said host device,
wherein said data multiplexing device exists outside of said host computer and is connected to said host computer.

7. A data multiplexing system according to claim 1, further comprising:
a host computer having said host device,
wherein said data multiplexing device is assembled inside of said host computer.

8. A data multiplexing system according to claim 1, wherein said data multiplexing device is assembled inside of said storage system.

9. A data multiplexing device comprising:
a host interface controller connected to a host device for issuing an original data write/read instruction and connected to first and second storage systems for storing data for said host device, thereby to make a communication connection to said host device;
first and second slave interface units for making communication connections to said first and second storage systems, respectively;
a multiplexing controller for accepting the original data write/read instruction from said host device through said host interface controller and for creating first and second data write/read instructions by multiplexing said original data write/read instruction;
a monitor memory; and
a monitor for storing in said monitor memory time information and a data I/O address of said first and second data write/read instructions, for issuing said first and second data write/read instructions, respectively, to said first and second storage systems through said first and second slave interface units, for accepting responses individually from said first and second storage systems to said first and second data write/read instructions, for creating responses to said original data write/read instruction based on the responses from said first and second storage systems, and for returning the created responses to said host device,
wherein said monitor decides based on said time information stored in said monitor memory whether or not the responses from said first and second storage systems have arrived within a predetermined permissible time, and creates a response to said original data write/read instruction in accordance with a result of the decision,
wherein said multiplexing controller creates first and second data write instructions, if said original data write/read instruction is a data write instruction, by multiplexing said original data write instruction, wherein said monitor issues said first and second data write instructions, respectively, to said first and second storage systems, creates data write/read completion notifications as a response to said original data write instruction after a response indicating a write completion notification has arrived from said first and second storage systems within said permissible time, and returns said data write/read completion notifications to said host device, wherein said data multiplexing device is connected to a data recovery controller for instructing said data multiplexing device to execute a data recovery processing, and wherein said monitor creates a data write/read completion notification as the response to said original data write instruction, and if the response indicating said write completion notification has arrived from said first storage system within said permissible time, but the response indicating said write completion notification has not arrived from said second storage system within said permissible time, returns said data write/read completion notification to said host device, decides that the data write processing has abnormally ended in said second storage system, and sends an abnormal end notification on said second storage system to said data recovery controller.

10. A data multiplexing device according to claim 9, wherein said monitor sends a first data write instruction based on a new original data write instruction, to said first storage system but not a second data write instruction based on said new original data write instruction, to said second storage system, each time said new original data write instruction is issued from said host device after it decided that the data write processing in said second storage system abnormally ended, and stores said monitor memory with the time information and the data write address of a first data write instruction according to said new original data write instruction, and wherein said monitor extracts the unmultiplexed data, which are stored in said first storage system but not in said second storage system, in case it is instructed to execute the data recovery processing from said data recovery controller after it decided that the data write processing in said second storage system was abnormally ended, based on the time information and the data write address of said first data write instruction, which have been issued and are stored in said monitor memory, and copies said extracted unmultiplexed data from said first storage system to said second storage system.

11. A data multiplexing device according to claim 10, wherein said monitor is instructed by data recovery controller to instruct said data multiplexing device the execution of the data recovery processing but also the ratio of said data recovery processing to the processing of the original data write/read instruction issued from said host device, and controls the distribution of the loads in said data multiplexing device between the processing of said original data write/read instruction and the processing to copy said unmultiplexed data from said first storage system to said second storage system, in accordance with said ratio instructed by said data recovery controller.

12. A data multiplexing device according to claim 9, wherein said multiplexing controller creates first and second data read instructions, if said original data write/read instruction is a data read instruction, by multiplexing said original data read instruction, and wherein said monitor issues said first and second data read instructions, respectively, to said first and second storage systems, and returns, after the response having the read data arrived from either of said first and second storage systems within said permissible time, said read data as the response to said original data read instruction, to said host device.

13. A data multiplexing device according to claim 9, further comprising:

first and second data cache memories assigned to said first and second storage systems, respectively, wherein said multiplexing controller creates first and second data write instructions, if said original data write/read instruction is a data write instruction, by multiplexing said original data write instruction, wherein said monitor accepts said first and second data write instructions from said multiplexing controller, and issues said first and second data write instructions to said first and second storage systems instantly without accessing to said first and second data cache memories, wherein said multiplexing controller creates first and second data read instructions, in case said original data write/read instructions are a data read instruction, by multiplexing said original data read instruction, and wherein said monitor searches the object data of said first and second read instructions, respectively, from said first and second data cache memories, when it accepts said first and second data read instructions from said multiplexing controller, and issues said first and second data read instructions, respectively, to said first and second storage systems if said object data are not individually found from said first and second data cache memories.

14. A method for multiplexing data to be used in a host device and for storing the multiplexed data in a plurality of storage systems, comprising the following steps to be executed by a data multiplexing device connected to said host device and first and second storage systems:

accepting the original data write/read instruction from said host device;

creating first and second data write/read instructions by multiplexing said original data write/read instruction;

storing in said monitor memory time information and the data I/O address on said first and second data write/read instructions issuing said first and second data write/read instructions, respectively, to said first and second storage systems;

accepting responses individually from said first and second storage systems to said first and second data write/read instructions;

deciding based on time information stored in said monitor memory whether or not the responses from said first and second storage systems have arrived within a predetermined permissible time;

creating a response to said original data write/read instruction in accordance with a result of the decision; and returning the created response to said host device, wherein the following steps are executed at said data multiplexing device if said original data write/read instruction is a data write instruction:

creating first and second data write instructions by multiplexing said original data write instruction, issuing said first and second data write instructions, respectively, to said first and second storage systems, creating data write/read completion notifications as a response to said original data write instruction after a response indicating a write completion notification has arrived from said first and second storage systems within said permissible time, and returning said data write/read completion notifications to said host device, wherein after the step of issuing said first and second data write instructions, respectively, to said first and second storage systems:

if the response indicating said write completion notification has arrived from said first storage system within said permissible time but the response indicating said write completion notification has not arrived from said second storage system within said permissible time, the following steps are executed at said data multiplexing device:

creating a data write/read completion notification as the response to said original data write instruction, returning said created data write/read completion notification to said host device, and deciding that the data write processing has abnormally ended in said second storage system, and sending an abnormal end notification on said second storage system to said data recovery controller for instructing said data multiplexing device to execute the data recovery processing.

15. A data multiplexing method according to claim 14, further comprising the steps of:

deciding that the data write processing has abnormally ended in said second storage system, and sending an abnormal end notification on said second storage system to said data recovery controller for instructing said data multiplexing device to execute the data recovery processing;

sending a first data write instruction based on a new original data write instruction, to said first storage system but not a second data write instruction based on said new original data write instruction, to said second storage system, after said abnormal end notification was sent to said data recovery controller and each time said new original data write instruction is issued from said host device;

storing in said monitor memory time information and the data write address of a first data write instruction according to said new original data write instruction, after said abnormal end notification was sent to said data recovery controller and each time a new original data write instruction is issued from said host device;

extracting the unmultiplexed data, which are stored in said first storage system but not in said second storage system, after said abnormal end notification was sent to said data recovery controller and in case the execution of the data recovery processing is instructed from said data recovery controller, based on the time information and the data write address of said first data write instruction, which have been issued and are stored in said monitor memory; and copying said extracted unmultiplexed data from said first storage system to said second storage system.

16. A data multiplexing system comprising:

a host device including; a memory for storing an application program and an operating system; and a processor for running said application program and said operating system;

a data multiplexing device including; a first interface controller connected to said host device for accepting a data write instruction from said host device; a multiplexing controller for creating a copy of said data write instruction accepted by said first interface controller; a monitor for managing time information and attribute information from said multiplexing controller individually on said data write instruction and the copy of said data write instruction; a monitor memory for storing said time information and attribute information to be managed by said monitor; a second interface controller for transferring said data write instruction in accordance with the control by said monitor; and a third interface controller for transferring the copy of said data write instruction in accordance with the control by said monitor;

a first storage system including; a fourth interface controller connected to said second interface controller of said data multiplexing device for accepting said data write instruction from said second interface controller; a first storage controller connected to said fourth interface controller for accepting said data write instruction and controlling the write processing of write data; and a first storage drive device for storing said write data in accordance with the control by said first storage controller;

a second storage system including; a fifth interface controller connected to said third interface controller of said data multiplexing device for accepting the copy of said data write instruction from said third interface controller; a second storage controller connected to said fifth interface controller for accepting the copy of said data write instruction and controlling the write processing of the same data as said write data; and a second storage drive device for storing the same data as said write data in accordance with the control by said second storage controller, wherein said monitor of said data multiplexing device monitors the data write completion notification to said data write instruction returned from said first storage system, based on said time information and said attribute information stored in said monitor memory, and the data write completion notification to the copy of said data write instruction returned from said second storage system, and issues the data write completion notification to said data write instruction, to said host device after it accepted both said data write completion notification from said first storage system and said data write completion notification from said second storage system; and a data recovery controller for instructing said data multiplexing device to execute a data recovery processing, wherein said monitor creates a data write/read completion notification as a response to said original data write instruction, and if the response indicating said write completion notification has arrived from said first storage system within said permissible time, but if the response indicating said write completion notification has not arrived from said second storage system within said permissible time, returns said data write/read completion notification to said host device, decides that the data write processing has abnormally ended in said second storage system, and sends an abnormal end notification on said second storage system to said data recovery controller.

* * * * *